United States Patent
Nakajima et al.

(10) Patent No.: US 8,423,085 B2
(45) Date of Patent: Apr. 16, 2013

(54) ELECTRONIC APPARATUS, CONTROL METHOD THEREOF, CONTROL PROGRAM THEREOF, AND RECORDING MEDIUM

(75) Inventors: Yuko Nakajima, Kawasaki (JP); Yoshiaki Kikuchi, Kawasaki (JP); Tohru Ida, Kawasaki (JP); Manabu Nanba, Kawasaki (JP); Kenetsu Furuki, Kawasaki (JP); Hironobu Taniguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 981 days.

(21) Appl. No.: 11/699,379

(22) Filed: Jan. 30, 2007

(65) Prior Publication Data
US 2008/0076488 A1 Mar. 27, 2008

(30) Foreign Application Priority Data
Sep. 22, 2006 (JP) .................... 2006-257324

(51) Int. Cl.
*H04B 1/38* (2006.01)
(52) U.S. Cl.
USPC ............ 455/566; 455/575.1; 715/810
(58) Field of Classification Search .......... 455/566, 455/575.1, 550.1; 715/764, 810, 864, 841; 345/158
See application file for complete search history.

(56) References Cited

U.S. PATENT DOCUMENTS

| 2003/0013417 | A1 | 1/2003 | Bum | |
| 2003/0064758 | A1* | 4/2003 | Mizuta et al. | 455/566 |
| 2003/0203747 | A1 | 10/2003 | Nagamine | |
| 2005/0237298 | A1* | 10/2005 | Hwang | 345/158 |
| 2007/0192711 | A1* | 8/2007 | Lee et al. | 715/764 |
| 2007/0249407 | A1 | 10/2007 | Bum | |

FOREIGN PATENT DOCUMENTS

| JP | 2001-156893 A | 6/2001 |
| JP | 2003-319043 A | 11/2003 |
| JP | 2004-242347 A | 8/2004 |
| JP | 2005-160052 A | 6/2005 |
| KR | 2003-0000166 A | 1/2003 |
| KR | 10-2006-0045849 A | 5/2006 |

OTHER PUBLICATIONS

Translation—Tadashi_Display System and its Method for Communication Apparatus _JP2001156893A.pdf.*

(Continued)

*Primary Examiner* — Charles Appiah
*Assistant Examiner* — Alexander Yi
(74) *Attorney, Agent, or Firm* — Fujitsu Patent Center

(57) ABSTRACT

The present invention relates to an electronic apparatus having a displaying function in a housing unit thereof that is rotatable or can be opened/closed, and facilitates effective use of the displaying capacity in the lateral direction that the horizontally oriented screen elongated in the horizontal direction has. An electronic apparatus (a portable terminal apparatus 2) having a displaying function in a housing unit thereof that can be opened/closed or is rotatable, including a displaying unit 18 that displays a vertically oriented screen or a horizontally oriented screen 176, and a controlling unit (a CPU 90) that, when text information or information including a text is displayed in the displaying unit, sets a displaying column (a text displaying column 178) in the full lateral width that the horizontally oriented screen has and can be displayed, in the horizontally oriented screen 176 set on the displaying unit, and causes the information to be displayed in the displaying column.

25 Claims, 20 Drawing Sheets

OTHER PUBLICATIONS

Chinese Office Action dated Oct. 16, 2009, issued in corresponding Chinese Patent Application No. 2007100850468.

Korean Office Action dated Oct. 28, 2008, issued in corresponding Korean Patent Application No. 10-2007-0009535.

"Japanese Office Action", mailed Sep. 7, 2010 from JP Patent Office for corresponding JP Patent Application No. 2006-257324, with partial English translation.

* cited by examiner

ELECTRONIC APPARATUS, CONTROL METHOD THEREOF, CONTROL PROGRAM THEREOF, AND RECORDING MEDIUM

CROSS-REFERENCE TO RELATED APPLICATIONS

This application is based upon and claims the benefit of priority from the prior Japanese Patent Application No. 2006-257324, filed on Sep. 22, 2006, the entire contents of which are incorporated herein by reference.

BACKGROUND OF THE INVENTION

1. Field of the Invention

The present invention relates generally to an electronic apparatus such as a portable terminal apparatus having a display function in a housing unit that is rotatable and/or can be opened and closed, and, more particularly, to an electronic apparatus that displays a text such as a mail text in a full-width display (so-called a full-text display) by switching the display thereof to a horizontally oriented screen, a control method thereof, a control program thereof, and a recording medium.

2. Description of the Related Art

Conventionally, an electronic apparatus is known such as a portable terminal apparatus having a folding function and a rotating function in a housing unit thereof, and a displaying unit and an input operating unit in another housing unit thereof. Concerning such an electronic apparatus, Japanese Patent Application Laid-Open Publication No. 2003-319043 discloses that: a lower component having an operating unit and an upper component having a displaying unit are adapted to be foldable by connecting the components by a hinging unit; the upper component of the displaying unit component is adapted to be rotatable and slidable using a rotation/sliding mechanism; and the displaying unit of the displaying unit component is adapted to be set in a vertically oriented posture or a horizontally oriented posture thereof to display using the rotating and sliding operation. The above '043 publication describes that a large amount of character information can be checked easily with a display screen that is horizontally oriented and, when a horizontally wide image is displayed, the image is easy to understand (the abstract, FIG. 2, paragraph No. 0053, etc.)

It is natural for a rectangular displaying unit that, when the displaying unit is set in the horizontally oriented posture, the horizontal display width becomes larger than that of the vertically oriented posture thereof and the number of characters to be displayed can be increased. Concerning this, the above '043 publication only includes description for the advantages of the horizontally oriented display, camera shooting, and image display.

A problem has also arisen that operation of a user takes time when the user shifts the posture of the displaying unit to the horizontally oriented posture in the case where the shifting needs not only the rotating operation but also the sliding operation of the displaying unit (the above '043 publication).

An electronic apparatus such as a portable terminal apparatus displays a large amount of texts on a displaying unit thereof for transmission and reception of electronic mail and receiving provided information from the Internet and the contents of the texts displayed are diversified. The amount of information contained in electronic mail and characters provided tend to be large and the texts displayed tend to be long. Expediting of grasp of such texts is being sought. "Electronic mail" is a system that exchanges information such as characters in the form of a text using terminal apparatuses such as computers through a network using computers.

The above '043 publication has no disclosure and no suggestion concerning the above problems and no disclosure and no suggestion for any configuration, etc., to solve the problems.

SUMMARY OF THE INVENTION

An object of the present invention relates to an electronic apparatus that has a displaying function in a housing unit thereof that is rotatable and/or can be opened and closed, and is to facilitate an effective use of a horizontal displaying capacity that a horizontally oriented screen that is horizontally elongated has.

Another object of the present invention relates to an electronic apparatus that has a displaying function in a housing unit thereof that is rotatable and/or can be opened and closed, and is to improve functionality and/or operability.

To achieve the above objects, the present invention relates to an electronic apparatus such as a portable terminal apparatus having a displaying function in a housing unit thereof that is rotatable and/or can be opened and closed, and realizes full-text display by setting in a displaying column the full horizontal width that can be displayed in a horizontally oriented screen in a displaying unit and displaying the information in the displaying column in case of displaying text information or information including a text. By utilizing the displaying function of the horizontally oriented screen as above, the displaying function for information such as a text can be improved and more easy grasp of the contents of information can be facilitated. Because the horizontally oriented screen can be achieved only by rotating the displaying unit, this contributes to improvement of functionality and operability of an electronic apparatus having a displaying function. Therefore, the above objective can be achieved.

In order to achieve the above objects, according to a first aspect of the present invention there is provided an electronic apparatus having a displaying function in a housing unit thereof that can be opened/closed or is rotatable, comprising a displaying unit that displays a vertically oriented screen or a horizontally oriented screen; and a controlling unit that, in case that text information or information including a text is displayed in the displaying unit, sets a displaying column in the full lateral width that the horizontally oriented screen has and can be displayed, in the horizontally oriented screen set on the displaying unit, and causes the information to be displayed in the displaying column.

Preferably, in case that a text list is displayed, the controlling unit sets a text list displaying column having a substantially same width as that of the vertical oriented screen, in the horizontally oriented screen, and causes a text title to be displayed in the text list displaying column. Preferably, in case that a text list is displayed, the controlling unit, sets a status displaying column, and a text list displaying column having a substantially same width as that of the vertical oriented screen, in the horizontally oriented screen,and causes text titles to be displayed in the text list displaying column. Preferably, in case that the text list display is changed to a text contents display, the controlling unit sets a displaying column having the full lateral width that can be displayed, in the horizontally oriented screen of the displaying unit, and causes the information to be displayed in the displaying column. Preferably, in case that the vertically oriented screen on the displaying unit is switched to the horizontally oriented screen, the controlling unit switches the display contents of the vertically oriented screen to the displaying column of the horizontally oriented screen and displays the displaying column. Preferably, the electronic apparatus comprises a rotation sensor that detects a rotation and/or a rotation position of the displaying unit, wherein the controlling unit switches the display of the displaying unit to the display of the horizontally oriented screen based on detected information of the rotation sensor. Preferably, the electronic apparatus comprises an opened/closed state sensor that detects an opened state or a closed state of the displaying unit, wherein the controlling unit switches the display of the displaying unit from a horizontal sub screen to the horizontally oriented screen in case that the opened/closed state sensor detects the opened state of the displaying unit. Preferably, in the electronic apparatus, a movable arm unit is fitted to a fixed housing unit through a hinging unit, wherein a movable housing unit is fitted rotatably to the movable arm unit, and wherein the displaying unit is mounted on the movable housing unit. Preferably, the text is a mail text. Preferably, the horizontal sub screen is displayed in case that the displaying unit that is closed is rotated to the right or the left.

In order to achieve the above objects, according to a second aspect of the present invention there is provided a control method of an electronic apparatus having a displaying function in a housing unit thereof that can be opened/closed or is rotatable, comprising steps of displaying a vertically oriented screen or a horizontally oriented screen; and in case that text information or information including a text is displayed, setting a displaying column in the full lateral width that the horizontally oriented screen has and can be displayed, in the horizontally oriented screen, and causing the information to be displayed in the displaying column.

Preferably, the control method of an electronic apparatus comprises the step of in case that a text list is displayed, setting a text list displaying column having a substantially same width as that of the vertical oriented screen, in the horizontally oriented screen, and causing text titles to be displayed in the text list displaying column. Preferably, the control method of an electronic apparatus comprises the step of in case that a text list is displayed, setting a status displaying column, and a text list displaying column having a substantially same width as that of the vertical oriented screen, in the horizontally oriented screen, and causing text titles to be displayed in the text list displaying column. Preferably, the control method of an electronic apparatus comprises the step of in case that the text list display is changed to a text contents display, setting a displaying column having the full lateral width that can be displayed, in the horizontally oriented screen, and causing the information to be displayed in the displaying column. Preferably, the control method of an electronic apparatus comprises the step of in case that the vertically oriented screen is switched to the horizontally oriented screen, switching the display contents of the vertically oriented screen to the text displaying column of the horizontally oriented screen and displaying the text displaying column. Preferably, the control method of an electronic apparatus comprises the step of switching the display to the display of the horizontally oriented screen based on detected information on a rotation and/or a rotation position of the housing unit. Preferably, the control method of an electronic apparatus comprises the step of switching the display from a horizontal sub screen to the horizontally oriented screen based on detected information on an opened state or a closed state of the housing unit.

In order to achieve the above objects, according to a third aspect of the present invention there is provided a control program of an electronic apparatus having a displaying function in a housing unit thereof that can be opened/closed or is rotatable, executed by a computer, the program causing the computer to execute the steps of displaying a vertically oriented screen or a horizontally oriented screen; and in case that text information or information including a text is displayed, setting a displaying column in the full lateral width that the horizontally oriented screen has and can be displayed, in the horizontally oriented screen, and causing the information to be displayed in the displaying column.

Preferably, The control program of an electronic apparatus comprises the step of in case that a text list is displayed, setting a text list displaying column having a substantially same width as that of the vertical oriented screen, in the horizontally oriented screen, and causing text titles to be displayed in the text list displaying column. Preferably, the control program of an electronic apparatus comprises the step of in case that a text list is displayed, setting a status displaying column, and a text list displaying column having a substantially same width as that of the vertical oriented screen, in the horizontally oriented screen, and causing text titles to be displayed in the text list displaying column. Preferably, the control program of an electronic apparatus comprises the step of in case that the text list display is changed to a text contents display, setting a displaying column having the full lateral width that can be displayed, in the horizontally oriented screen, and causing the information to be displayed in the displaying column. Preferably, the control program of an electronic apparatus comprises the step of in case that the vertically oriented screen is switched to the horizontally oriented screen, switching the display contents of the vertically oriented screen to the text displaying column of the horizontally oriented screen and displaying the text displaying column. Preferably, the control program of an electronic apparatus comprises the step of switching the display to the display of the horizontally oriented screen based on detected information on a rotation and/or a rotation position of the housing unit. Preferably, the control program of an electronic apparatus comprises the step of switching the display from a horizontal sub screen to the horizontally oriented screen based on detected information on an opened state or a closed state of the housing unit.

In order to achieve the above objects, according to a fourth aspect of the present invention there is provided a recording medium that stores computer readable a control program of an electronic apparatus having a displaying function in a housing unit thereof that can be opened/closed or is rotatable, the control program causing a computer to execute the steps of displaying a vertically oriented screen or a horizontally oriented screen; and in case that text information or information including a text is displayed, setting a displaying column in the full lateral width that the horizontally oriented screen has and can be displayed, in the horizontally oriented screen, and causing the information to be displayed in the displaying column.

Preferably, the recording medium that stores computer readable a control program of an electronic apparatus comprises the step of in case that a text list is displayed, setting a text list displaying column having a substantially same width as that of the vertical oriented screen, in the horizontally oriented screen, and causing text titles to be displayed in the text list displaying column. Preferably, the recording medium that stores computer readable a control program of an electronic apparatus comprises the step of in case that a text list is displayed, setting a status displaying column, and a text list displaying column having a substantially same width as that of the vertical oriented screen, in the horizontally oriented screen, and causing text titles to be displayed in the text list displaying column. Preferably, the recording medium that stores computer readable a control program of an electronic apparatus comprises the step of in case that the text list display is changed to a text contents display, setting a displaying column having the full lateral width that can be displayed, in the horizontally oriented screen, and causing the information to be displayed in the displaying column. Preferably, the recording medium that stores computer readable a control program of an electronic apparatus comprises the step of in case that the vertically oriented screen is switched to the horizontally oriented screen, switching the display contents of the vertically oriented screen to the text displaying column of the horizontally oriented screen and displaying the text displaying column. Preferably, the recording medium that stores computer readable a control program of an electronic apparatus comprises the step of switching the display to the display of the horizontally oriented screen based on detected information on a rotation and/or a rotation position of the housing unit. Preferably, the recording medium that stores computer readable a control program of an electronic apparatus, comprises the step of: switching the display from a horizontal sub screen to the horizontally oriented screen based on detected information on an opened state or a closed state of the housing unit.

The features and advantages of the present invention are listed as follows.

(1) When text information consisting of character strings, etc., or information including a text is displayed, the information is displayed by setting the displaying column to have a full horizontal width that can be displayed for the horizontally oriented screen. Therefore, improvement of the information displaying function can be facilitated and grasp of the displayed information is facilitated.

(2) Because the apparatus has the above function and can switch the contents of displaying on the screen thereof between the vertically oriented screen and the horizontally oriented screen, the functionality and/or the operability of the electronic apparatus can be improved.

Other objects, features, and advantages of the present invention can be more apparent by referring to the accompanying drawings and embodiments.

DETAILED DESCRIPTION OF THE PREFERRED EMBODIMENTS

First Embodiment

Figure 1:
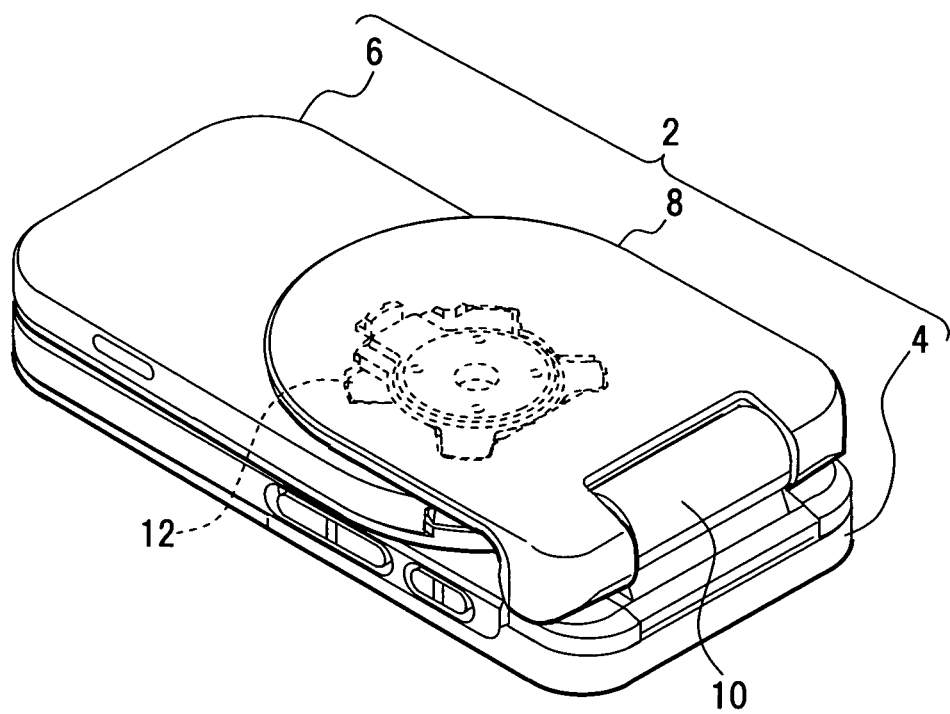
FIG. 1 depicts a perspective view of a portable terminal apparatus according to a first embodiment.
Figure 2:
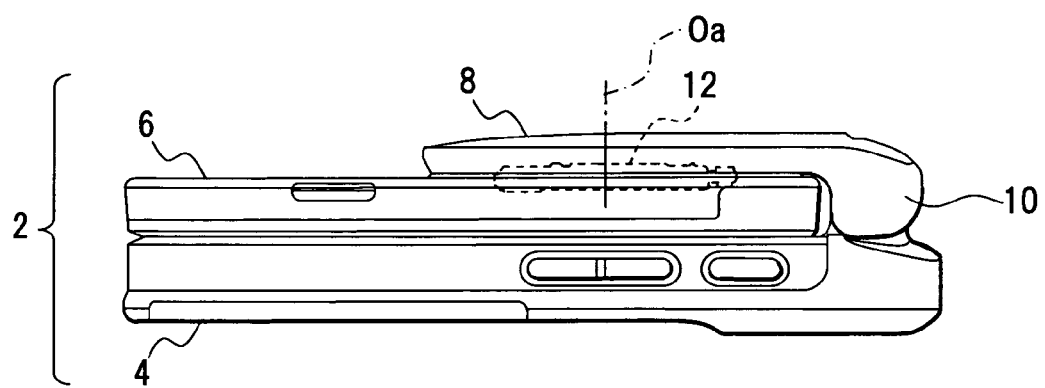
FIG. 2 depicts a side view of a closed state of the portable terminal apparatus.
Figure 3:
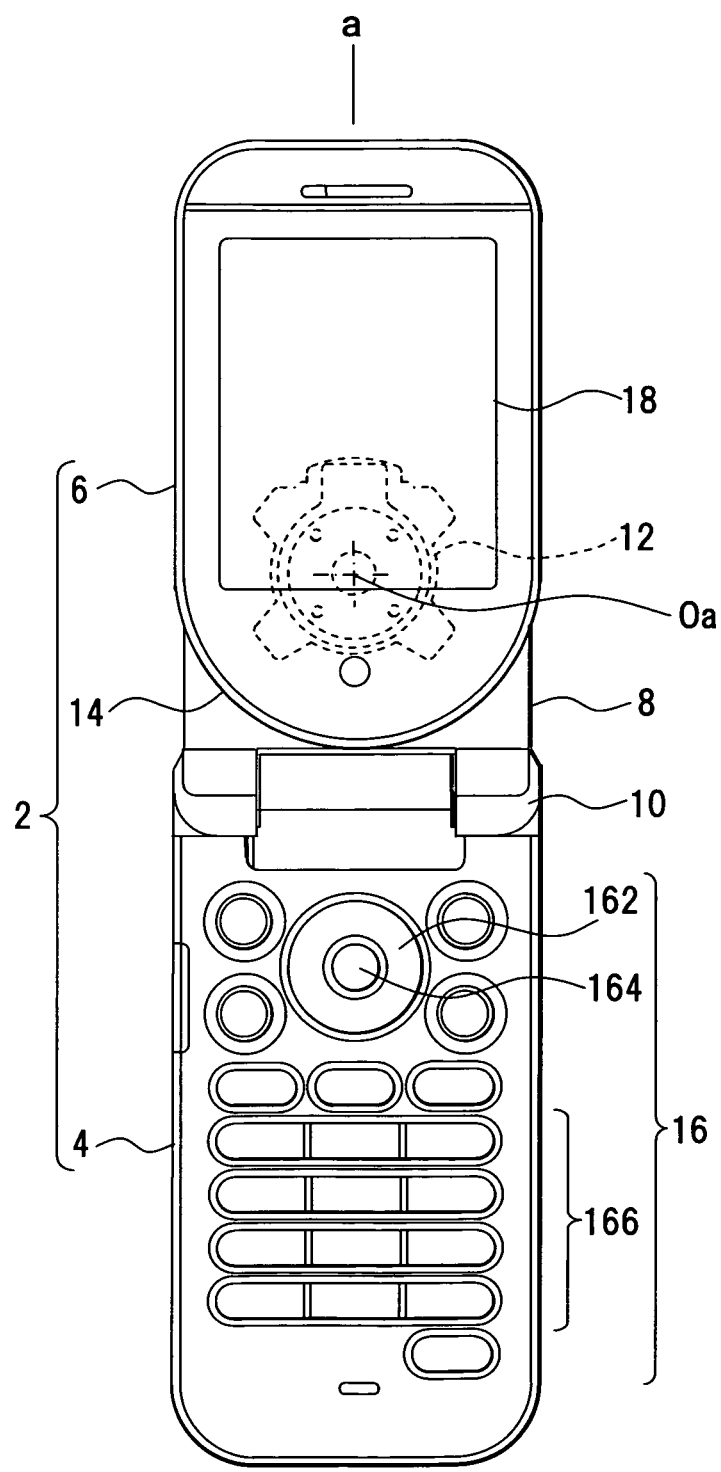
FIG. 3 depicts a front view of an opened state of the portable terminal apparatus.
Figure 4:
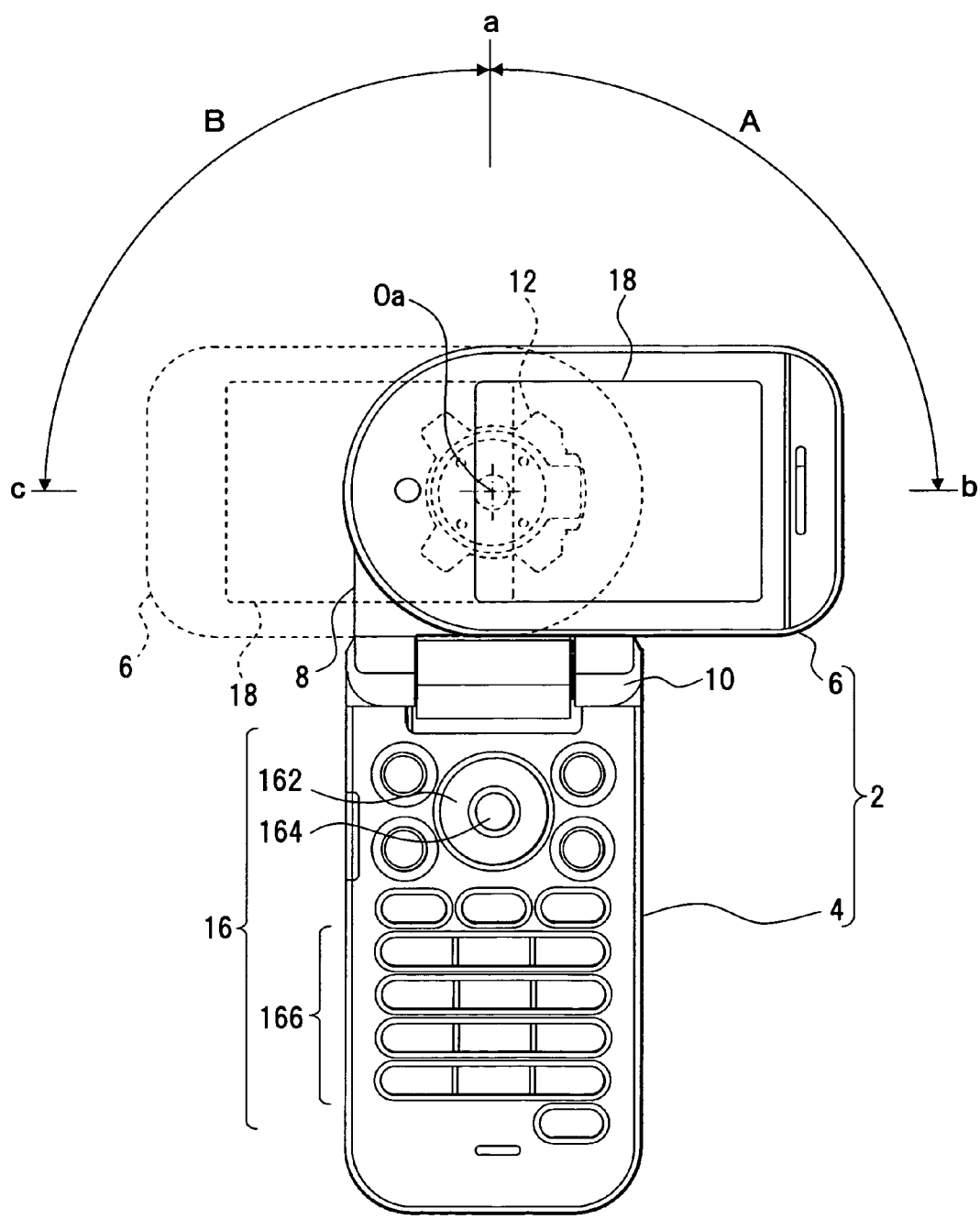
FIG. 4 depicts a (counter)clockwise rotation of a movable housing unit of the portable terminal apparatus in the opened state.

Description will be given for a first embodiment of the present invention referring to FIGS. 1 to 4. FIG. 1 depicts a perspective view of a portable terminal apparatus. FIG. 2 depicts a side view of a closed state of the portable terminal apparatus. FIG. 3 depicts a front view of an opened state of the portable terminal apparatus. FIG. 4 depicts a (counter)clockwise rotation of a movable housing unit of the portable terminal apparatus in the opened state.

A portable terminal apparatus 2: has a plurality of movable units such as an opening and closing unit and a rotating unit; is an example of an electronic apparatus that is rotatable and/or can be opened and closed; and, as shown in FIGS. 1 and 2, has a fixed housing unit 4 as an operating-side housing unit and a movable housing unit 6 as a displaying-side housing unit. The fixed housing unit 4 is fitted with a movable arm unit 8 by a hinging unit 10 that is the opening and closing unit. The movable arm unit 8 is fitted with a rotating module 12 as a rotation supporting unit. The rotating module 12 is fixed with the movable housing unit 6. In this case, the movable housing unit 6 can be opened and closed due to a rotation around the hinging unit 10 as the center thereof and the movable housing unit 6 can be rotated for a predetermined angle toward both of the right and left from the central position (the reference position of the rotation) thereof due to a rotation around the rotating module 12 as the center thereof. That is, in the embodiment, a housing unit that can be opened and closed against each other and/or is rotatable is configured by the fixed housing unit 4, the movable housing unit 6, and/or the movable arm unit 8.

As shown in FIG. 3, the rotation center Oa of the movable housing unit 6 is set at a position in the vicinity of the hinging unit 10 and a circumferential portion 14 is formed on the movable housing unit 6 as an edge portion having a semicircular shape. The fixed housing unit 4 mounts an input operating unit 16 having a plurality of keys such as symbol keys and a cursor key. The movable housing unit 6 mounts a displaying unit 18 as a displaying component including LCD (Liquid Crystal Display) devices, etc. The input operating unit 16 includes a cursor key 162, a determination key 164, character input keys 166, etc. The displaying unit 18 has a rectangular shape of which the lateral and the longitudinal lengths differ from each other and displays, for example, a vertically oriented screen that is elongated in the vertical direction as a first screen and, for example, a horizontally oriented screen that is elongated in the lateral direction, corresponding to a rotation angle θ (zero degree to 90 degrees toward both of the right and left) of the movable housing unit 6.

According to the portable terminal apparatus 2, by including the hinging unit 10, the movable housing unit 6 can be opened and closed together with the movable arm unit 8. That is, as shown in FIG. 1, the movable housing unit 6 can be closed together with the movable arm unit 8 or, as shown in FIG. 3, can be maintained in the opened state. As shown in FIG. 4, the posture of the movable housing unit 6 can be varied to form an L-shape against the fixed housing unit 4 by being rotated for a predetermined angle, for example, 90 degrees toward the right or the left from the central position thereof by the rotating module 12. In the opened state shown in FIG. 4: "a" denotes a central position (the starting point of the (counter)clockwise rotation) that coincides with the center line of the movable housing unit 6; "b" denotes a right rotated position (the right-side rotation ending point) of the movable housing unit 6; and "c" denotes a left rotated position (the left-side rotation ending point) of the movable housing unit 6.

In the opened state of the movable housing unit 6: when the movable housing unit 6 is at the central position a, as shown in FIG. 3, a vertically oriented screen can be displayed on the displaying unit 18; when the movable housing unit 6 is at the right rotated position b, as depicted by a solid line in FIG. 4, a horizontally oriented screen can be displayed on the displaying unit 18; and when the movable housing unit 6 is at the left rotated position c, as depicted by a dotted line in FIG. 4, another horizontally oriented screen can be displayed on the displaying unit 18. An arrow "A" represents the rotation from the central position a to the right rotated position b and the rotation from the right rotated position b to the central position a (the reverse rotation) and this corresponds to a screen switching operation that switches from the vertically oriented screen to a right-side horizontally oriented screen. Similarly, an arrow "B" represents the rotation from the central position a to the left rotated position c and the rotation from the left rotated position c to the central position a (the reverse rotation) and this corresponds to another screen switching operation that switches from the vertically oriented screen to a left-side horizontally oriented screen.

Figure 5:
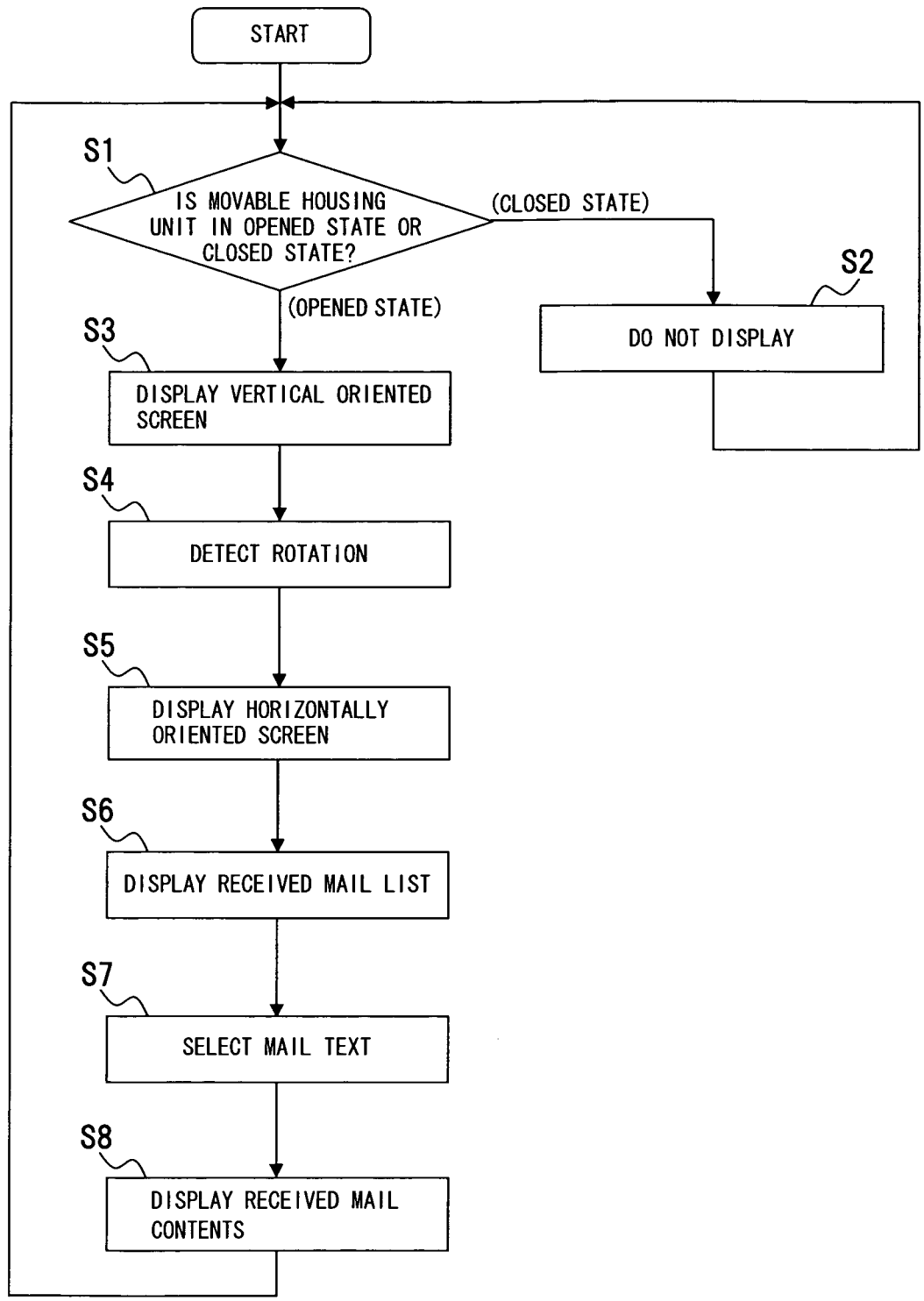
FIG. 5 depicts a flowchart of an example of a control method of the portable terminal apparatus.

Description will be given for a control method of the portable terminal apparatus 2 referring to FIGS. 1 to 4 and 5. FIG. 5 depicts a flowchart of a process procedure that is an example of a control method of the portable terminal apparatus 2.

According to the control method, whether the movable housing unit 6, that is, the displaying unit 18 is in the opened state or the closed state thereof is detected (step S1) and, when the unit 6 is in the closed state thereof, the movable housing unit 6 overlaps the fixed housing unit 4 and, therefore, the displaying unit 18 is in the closed state thereof and does not display (step S2).

When the movable housing unit 6 is in the opened state thereof (FIG. 3) and the rotation angle of the movable housing unit 6 is zero degree, the movable housing unit 6 is at the central position a and, therefore, the displaying unit 18 is in a vertically-oriented-screen state and displays the vertically oriented screen. (step S3).

When the movable housing unit 6 is rotated toward the right or rotated toward the left, based on the detection of the rotation (step S4), the state of the displaying unit 18 is transferred to a horizontally-oriented-screen state (step S5). At this time, the operation of the apparatus is in the horizontal main display mode and the displaying unit 18 displays a horizontally oriented screen that is elongated in the horizontal direction.

When a mail mode is started up, a received mail list displaying mode is started up and the horizontally oriented screen of the displaying unit 18 displays a list of received mail (step S6). The mail mode and the received mail list displaying mode are examples for the case where the displaying unit displays text information or information including a text.

Mail selection is executed as a selecting operation of a specific text from the received mail list displayed on the horizontally oriented screen of the displaying unit 18 (step S7). When the selected mail is determined, the mode of the operation is shifted from the received mail list displaying mode to a received mail contents displaying mode and the horizontally oriented screen of the displaying unit 18 displays the contents of the received mail (step S8).

The received mail contents displaying mode is also an example of the case where text information or information including a text is displayed and, in this mode, a displaying column having the full lateral width that the horizontally oriented screen has and can display is set in the horizontally oriented screen set on the displaying unit 18 and the displaying column displays character strings, etc., that are the contents of received mail as text information or information including text.

Therefore, the control method includes process steps such as switching of the display between the vertically oriented screen and the horizontally oriented screen, setting the displaying column in the full lateral width of the horizontal oriented screen and displaying a text, etc., in the displaying column, corresponding to the opening or closing operation of the fixed housing unit 4 and the movable housing unit 6, a rotation operation of the movable housing unit 6, etc.

a) Detection of Opening, Closing, or Rotation of the Movable Housing Unit 6

The movable housing unit 6 is opened or closed against the fixed housing unit 4 by the movable arm unit 8 and the hinging unit 10. In either the opening or the closing, the movable housing unit 6 can be rotated on the movable arm unit 8. Therefore, to change the displaying form corresponding to the rotation angle of the movable housing unit 6 according to the opened state or the closed state thereof, an opened state/closed state sensor 112 (FIG. 13) of a sensor unit 96 detects whether the movable housing unit 6 is in the opened state or the closed state and rotation sensors 42 and 44 (FIGS. 6 and 13) detect the rotation angle θ of the movable housing unit 6.

b) Screen Display and Switching Thereof

When the movable housing unit 6 is in the opened state thereof and at the central position a, the displaying unit 18 displays the vertically oriented screen. When the movable housing unit 6 is rotated to the right rotated position b, the displaying unit 18 displays the horizontally oriented screen. When the movable housing unit 6 is rotated to the left rotated position c, the display form of the displaying unit 18 is switched to a display form of the horizontally oriented screen. When the movable housing unit 6 is restored from the display position for the horizontally oriented screen to the central position a, the display of the displaying unit 18 is switched to the display of the vertically oriented screen. The switching of the display forms of the screen of the displaying unit 18 based on the detection of the opened state and the closed state and the detection of the rotation is executed according to a control program for screen switching.

c) Mail Mode Control

The mail mode includes the received mail list displaying mode and the received mail contents displaying mode. The received mail list displaying mode is a mode that causes the vertically oriented screen or the horizontally oriented screen of the displaying unit 18 to display on the screen a list of received mail that includes senders, titles, etc., in the time sequence, for example, from the latest one to older ones. The received mail contents displaying mode is a function that causes the contents of texts, etc., of received mail selected from the list displayed in the received mail list displaying mode to display on the screen.

The above process steps are switched as follows: when a mail mode is selected from a screen displaying a menu, the mode of the operation is shifted to the received mail list displaying mode; and, when a received mail is selected by an operation using the cursor key 162 and the determining key 164 from the display of the received mail list deployed on the screen, the mode of the operation is shifted to the received mail contents displaying mode; and the contents of the selected received mail are displayed on the horizontally oriented screen. Such control is executed by the control program described later.

d) Received Mail List Displaying Mode or Received Mail Contents Displaying Mode, and Screen Control When the movable housing unit 6 is rotated to be in the horizontal direction, the displaying unit 18 is in the horizontally-oriented-screen state and displays the horizontally oriented screen. In this case, the mail mode is being activated and, when the mode is shifted from the received mail list displaying mode to the received mail contents displaying mode, a displaying column having the full horizontal width that the horizontally oriented screen has and can be displayed on the screen is set in the horizontally oriented screen that is elongated in the horizontal direction, as a text displaying function for the horizontally oriented screen. The horizontally oriented screen using the full horizontal width thereof as the displaying column therein displays the contents of received mail. Because the character strings of the received mail are displayed in the displaying column set in the horizontally oriented screen that is elongated in the horizontal direction, the number of characters in a line is increased compared to the vertically oriented screen display having a small number of characters in the horizontal direction and many lines. Therefore, the text becomes easier to read and grasp of meaning of sentences becomes also easier.

Figure 6:
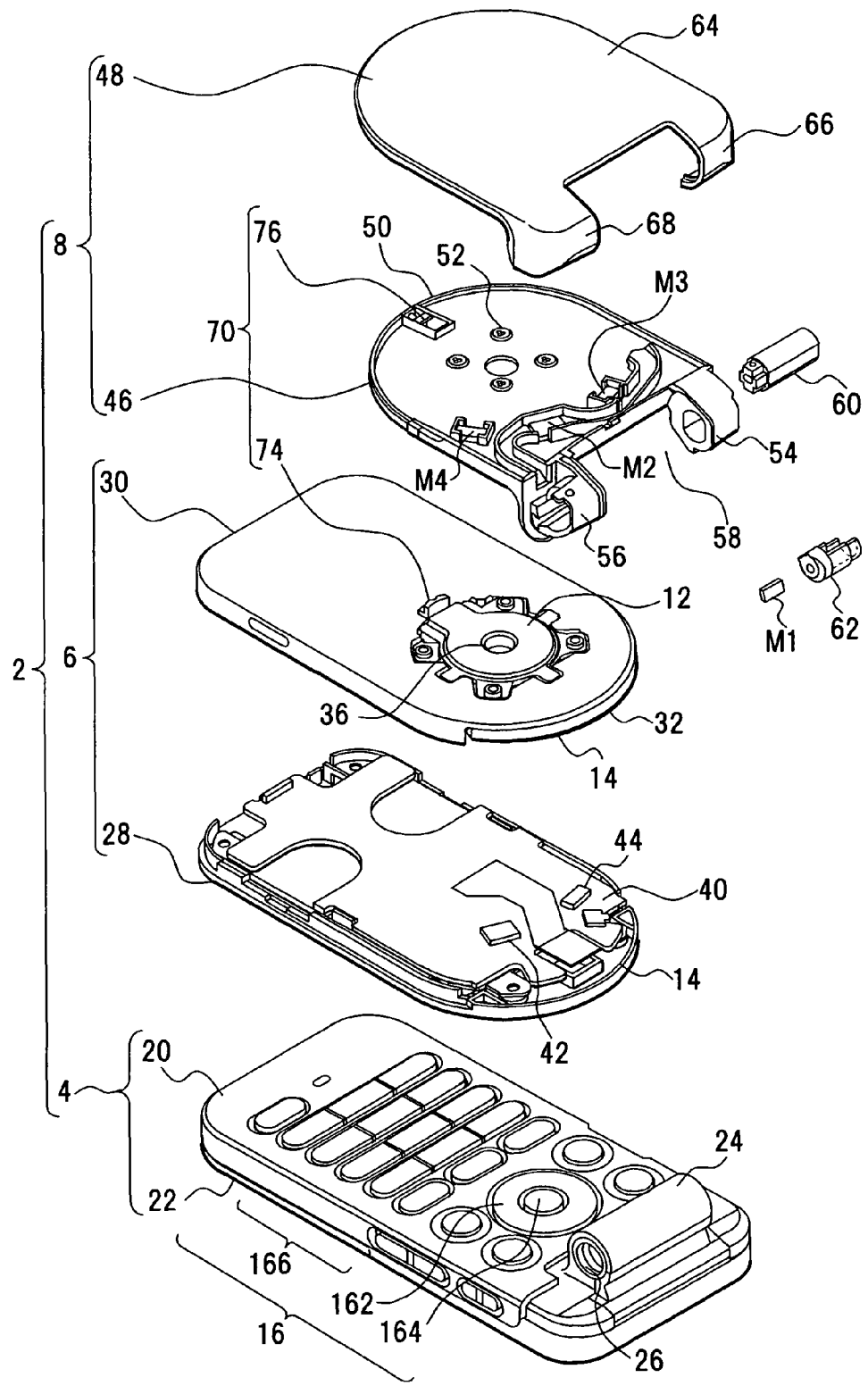
FIG. 6 depicts an exploded perspective view of the portable terminal apparatus.
Figure 7:
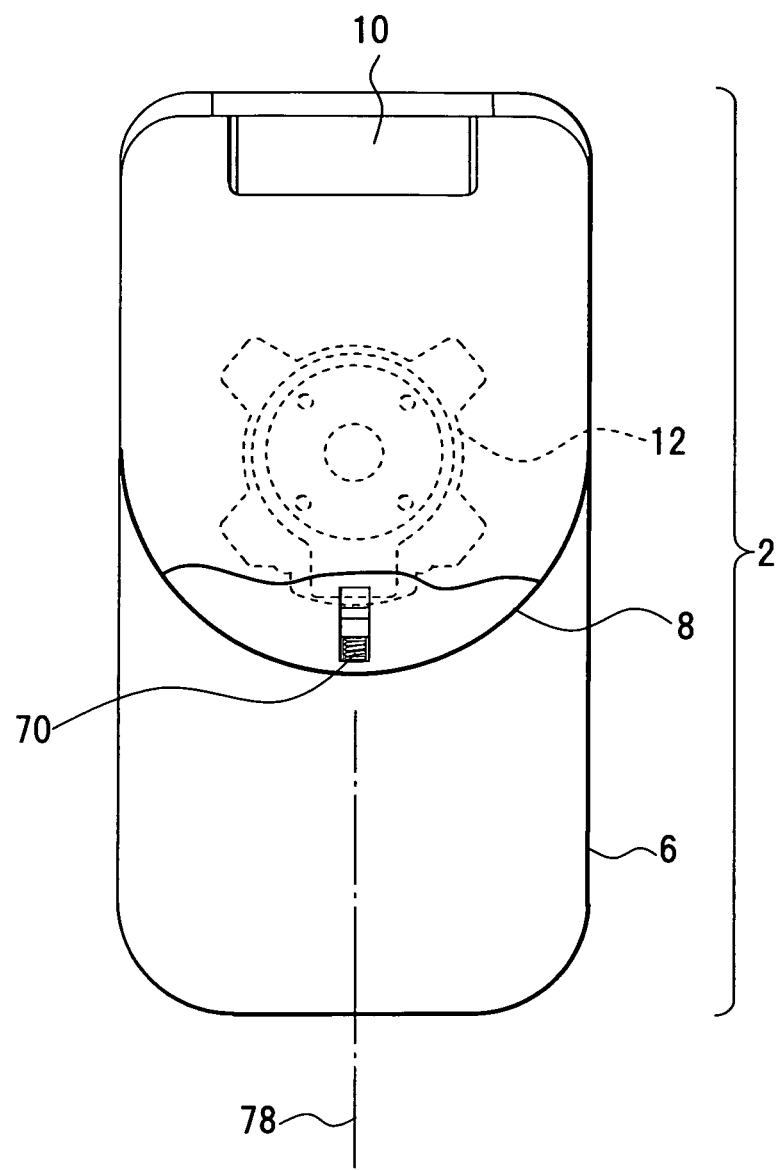
FIG. 7 depicts a position of a rotation locking mechanism of the portable terminal apparatus.
Figure 8:
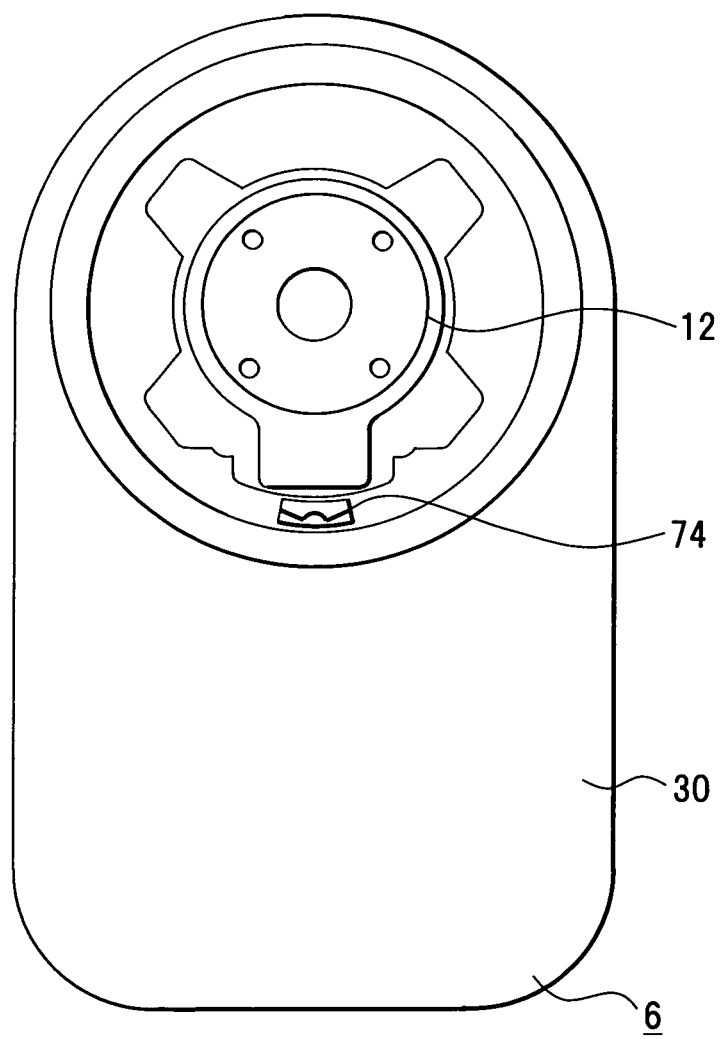
FIG. 8 depicts a plan view of a movable rear case unit.
Figure 9:
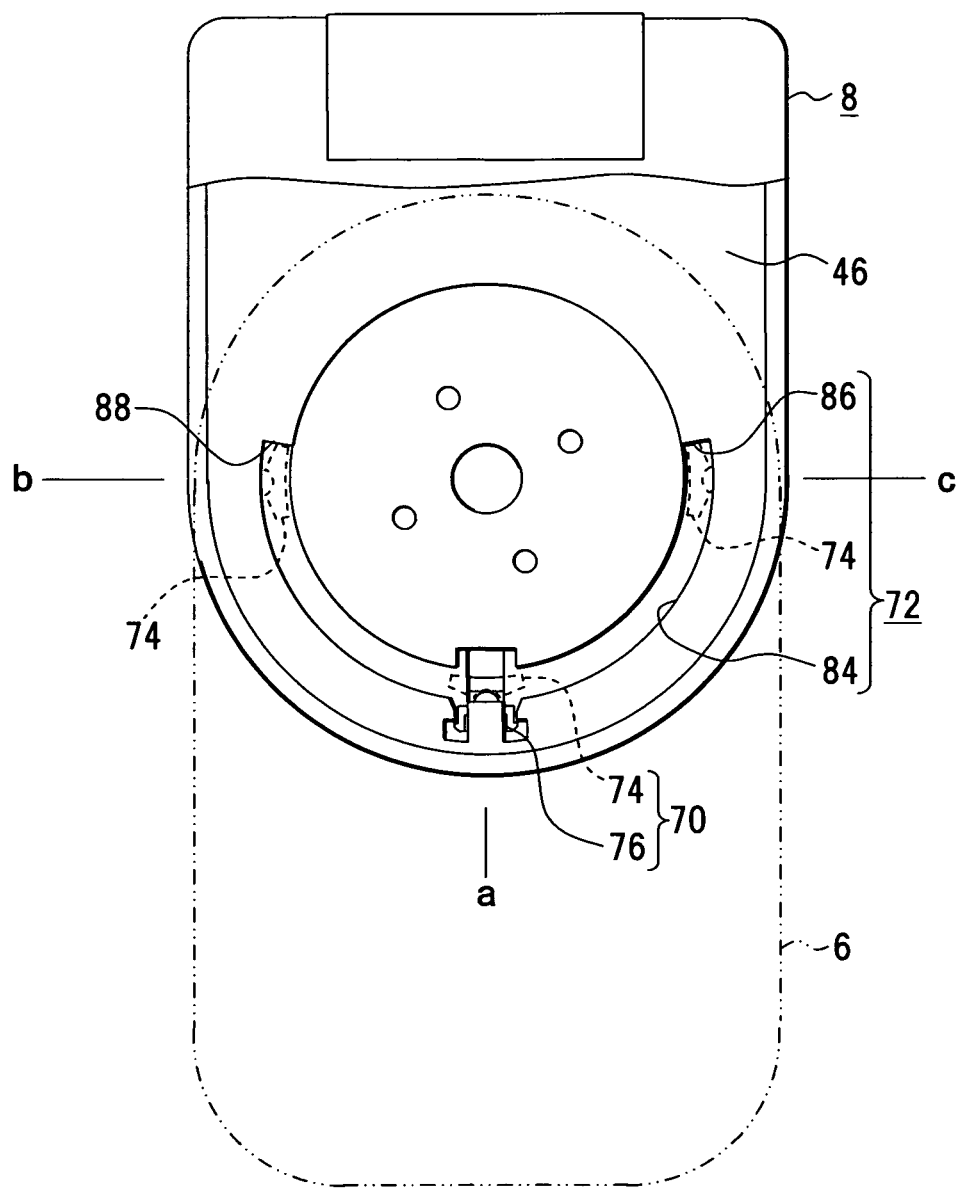
FIG. 9 depicts a bottom view of a movable arm unit.
Figure 10:
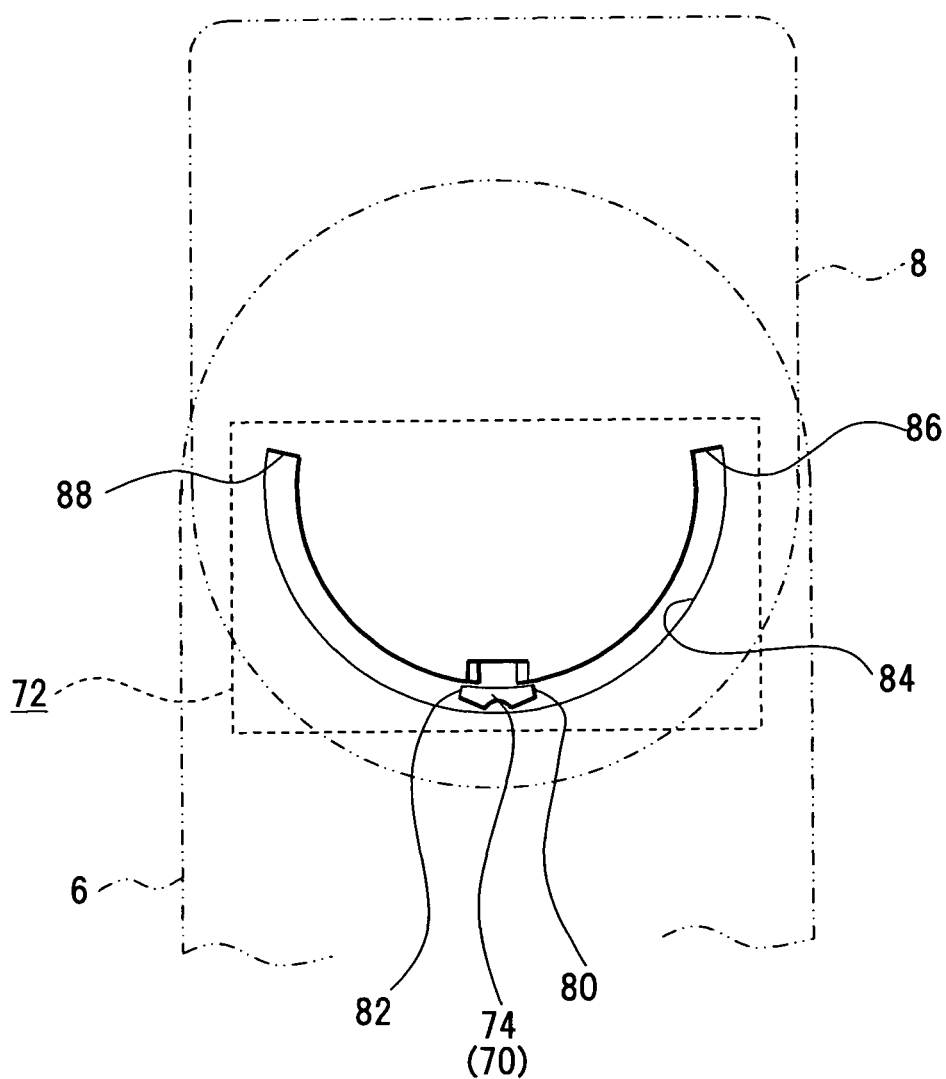
FIG. 10 depicts a stopper mechanism and a center stop position.
Figure 11:
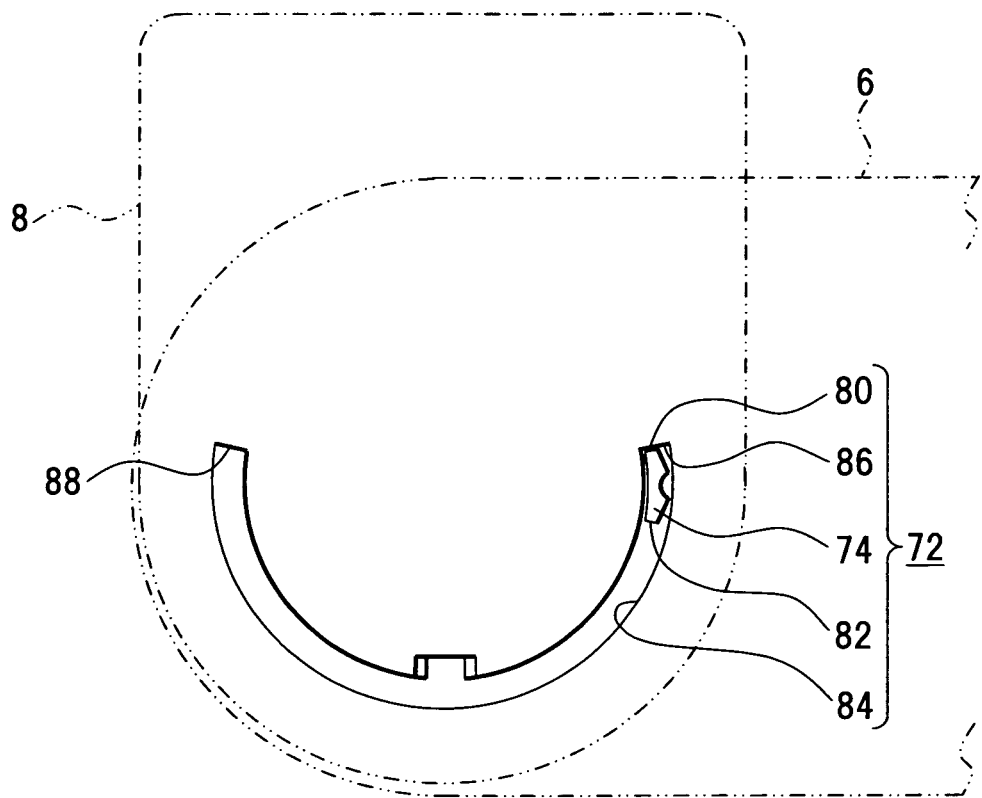
FIG. 11 depicts a stopper action.
Figure 12:
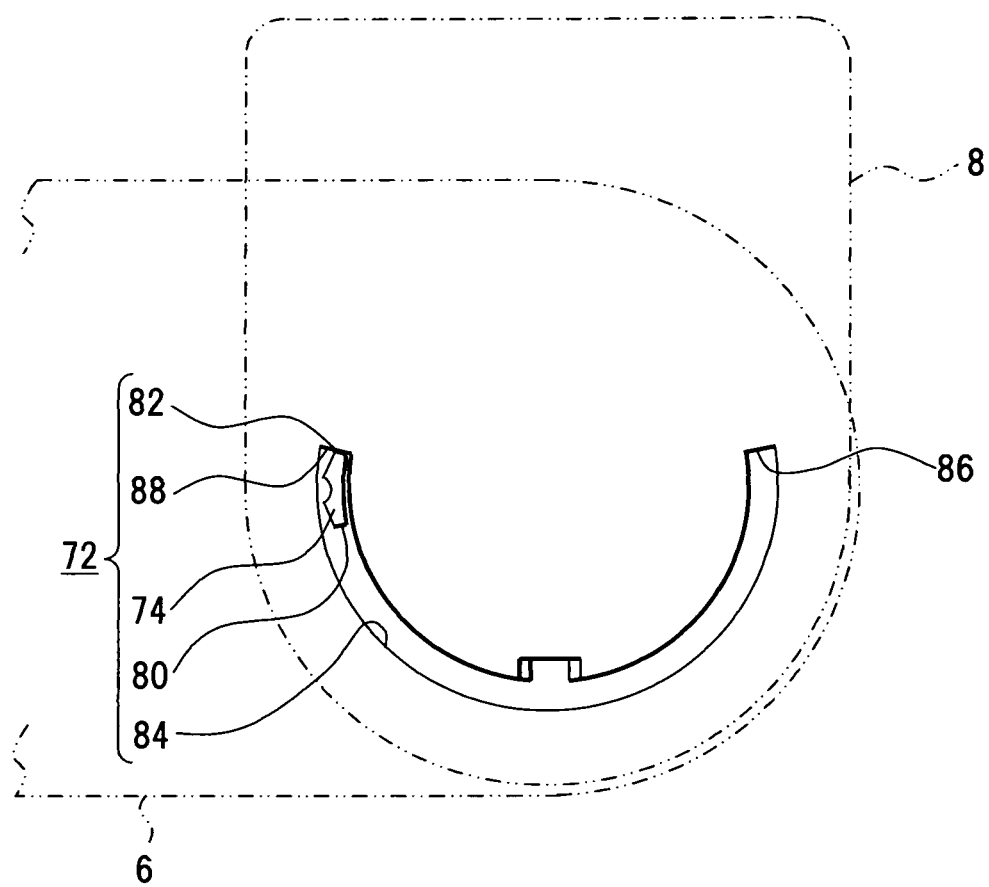
FIG. 12 depicts a stopper action.

Description will be given for an exemplary configuration of the portable terminal apparatus 2 referring to FIGS. 6 to 12. FIG. 6 depicts an exploded perspective view of the portable terminal apparatus 2. FIG. 7 depicts a position of a rotation locking mechanism of the portable terminal apparatus. FIG. 8 depicts a plan view of a movable rear case unit. FIG. 9 depicts a bottom view of the movable arm unit. FIGS. 10, 11, and 12 depict a stopper mechanism and actions thereof. In FIGS. 6 to 12, the same components as those in FIGS. 1 to 5 are given the same reference numerals.

As shown in FIG. 6, the fixed housing unit 4 includes a fixed front case unit 20 and a fixed rear case unit 22, and a bearing unit 24 of the hinging unit 10 is formed on the edge portion in the longitudinal direction of the fixed front case unit 20. A bearing hole is provided for the bearing unit 24. The fixed rear case unit 22 mounts a fixed-side substrate, etc.

The movable housing unit 6 includes a movable front case unit 28 and a movable rear case unit 30, and the rotating module 12 is fitted on the side of a circular portion 32 of the movable rear case unit 30. A through hole 36 is formed at the rotational central portion of the rotating module 12 and the through hole 36 is used for a cable not shown to pass therethrough.

The movable front case unit 28 mounts a movable-side substrate 40 and the movable-side substrate 40 mounts rotation sensors 42 and 44 that detect the direction of a rotation and the rotation angle θ of the movable housing unit 6.

The movable arm unit 8 includes an arm unit 46 and an arm cover unit 48. The movable rear case unit 30 of the movable housing unit 6, together with the rotating module 12 already described, is fixed by, for example, a plurality of screws 52 as fixing means on the side of a circular portion 50 of the arm unit 46. Bearing portions 54 and 56 of the hinging unit 10 are formed on the arm unit 46 and the bearing unit 24 of the fixed housing unit 4 is inserted in a space 58 between the bearing portions 54 and 56. A hinging module 60 as a hinging shaft that reaches the bearing unit 24 of the fixed housing unit 4 is inserted into and fixed in the bearing portion 54. A hinging module 62 as a hinging shaft is inserted into and fixed also in the bearing portion 56. The hinging module 62 may be configured as a cable guide for a cable not shown to pass therethrough.

The arm unit 46 of the movable arm unit 8 mounts three magnets M2, M3, and M4 as a plurality of magnets on the same track as that of the rotation sensors 42 and 44 mounted on the movable front case unit 28 of the movable housing unit 6. The central position a, the right rotated position b, or the left rotated position c of the rotating movable housing unit 6 is detected by the rotation sensors 42 and 44 and the magnets M2, M3, and M4.

The arm cover unit 48 includes a lid portion 64 covering the upper face of the arm unit 46 and covering portions 66 and 68 covering the bearing units 54 and 56. The lid portion 64 is joined with the arm unit 46 and protects the upper face of the arm unit 46. The covering portions 66 and 68 cover the circumferential wall portions of the bearing units 54 and 56 and reinforce and protect the bearing units 54 and 56.

As above, the hinging unit 10 is configured by the bearing unit 24 of the fixed housing unit 4, the bearing units 54 and 56 of the movable arm unit 8, and hinging modules 60 and 62, and supports the movable arm unit 8 on the fixed housing unit 4 such that the movable arm unit 8 can be opened and closed (in the embodiment, can be opened and closed for 180 degrees) The rotating module 12 supports rotatably the movable housing unit 6 on the movable arm unit 8.

The movable arm unit 8 supporting rotatably the movable housing unit 6 through the rotating module 12, and the movable housing unit 6 rotatable on the movable arm unit 8 due to the rotating module 12 mount a rotation locking mechanism 70 (FIG. 7, etc.) that determines the central position of the right and the left permissible rotation angles respectively of 90 degrees, that is, a zero-degree position of the movable housing unit 6, and a stopper mechanism 72 (FIG. 10, etc.) that determines the rotation range of the right and the left permissible rotation angles respectively of 90 degrees.

In the embodiment, as shown in FIG. 6, a pin engaging portion 74 of the rotation locking mechanism 70 is integrally formed on the movable rear case unit 30. As shown in FIG. 8, the pin engaging portion 74 is mounted at a position more externally than that of the rotating module 12 and protrudes on the upper face of the movable rear case unit 30. A locking pin 76 that engages with the pin engaging portion 74 is fitted to the arm unit 46 of the movable arm unit 8 and, in the embodiment, is installed inside the arm unit 46.

As shown in FIG. 9, the rotation locking mechanism 70 is a mechanism to fix and hold the movable housing unit 6 supported rotatably on the movable arm unit 8 through the rotating module 12, to/at a position with which the movable housing unit 6 coincides with the fixed housing unit 4, that is, the central position a. Fixing and holding the movable housing unit 6 to/at the movable arm unit 8 herein refers to that the fixing and the holding causes a user to recognize that the position is the reference position and is a holding state where the movable housing unit 6 does not move unless the user exerts a force toward the right or the left intending to rotate the unit 6, and does not assume any locked state where no move is allowed. That is, holding is maintained to the extent that the unit 6 can not be moved by a load for ordinary rotating operation.

In the embodiment, to fix and hold the movable housing unit 6 at a position with which the unit 6 coincides with the fixed housing unit 4, that is, the central position a, the rotation locking mechanism 70 is installed on a virtual central axis 78 (FIG. 7) that penetrates the rotation center Oa of the rotating module 12 fixed on the movable arm unit 8.

As shown in FIG. 10, the stopper mechanism 72 is adapted to set the maximal rotation angle of the (counter) clockwise rotation of the movable housing unit 6 with the rotation locking mechanism 70 at the center and to stop the movable housing unit 6 at the maximal rotation angle. In the embodiment, the pin engaging portion 74 is shared by a stopper portion and stopper faces 80 and 82 are formed on the pin engaging portion 74.

Corresponding to the pin engaging portion 74, an arcuate groove portion 84 into which the pin engaging portion 74 is inserted is formed, and stoppers 86 and 88 that contact stopper faces 80 and 82 of the pin engaging portion 74 at the end of the groove portion 84 are formed. More specifically, the stopper faces 80 and 82 respectively impinge on the stoppers 86 and 88 and the rotation of the movable housing unit 6 is blocked. The position at which the rotation is blocked is the position b or c that is 90 degrees away from the central fixing position a toward the left or the right.

According to the above configuration, when the movable housing unit 6 being present at a position as shown in FIG. 10 is rotated toward the left, as shown in FIG. 11, the stopper face 80 of the pin engaging portion 74 impinges the stopper 86 that is an end of the groove portion 84 and the movable housing unit 6 stops at the position of 90 degrees on the left. When the movable housing unit 6 being present at a position as shown in FIG. 10 is rotated toward the right, as shown in FIG. 12, the stopper face 82 of the pin engaging portion 64 impinges the stopper 88 that is another end of the groove portion 84 and the movable housing unit 6 stops at an angular position of 90 degrees on the right.

Figure 13:
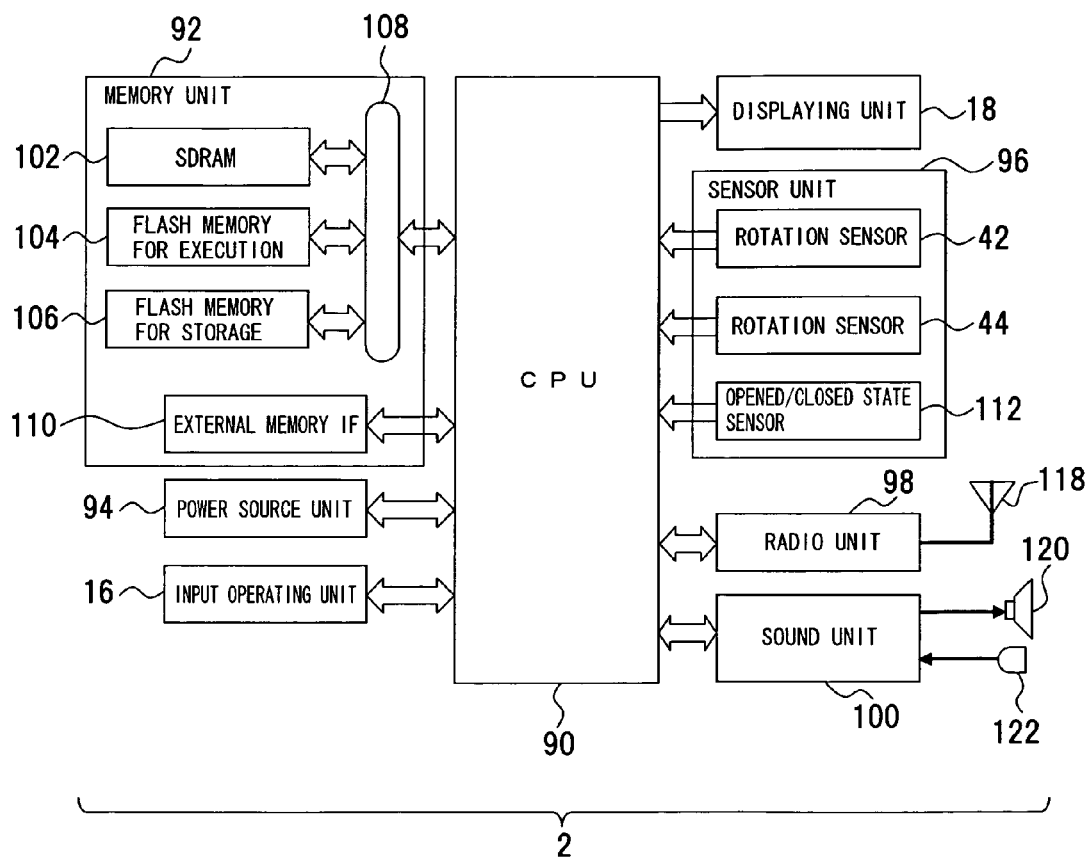
FIG. 13 depicts an exemplary circuit configuration of the portable terminal apparatus.

Description will be given for the circuit configuration of the portable terminal apparatus 2 referring to FIG. 13. FIG. 13 depicts a block diagram of an electric circuit unit of the portable terminal apparatus 2. In FIG. 13, the same components as those in FIGS. 1 to 12 are given the same reference numerals.

The portable terminal apparatus 2 has, in addition to a telephone function, a mail transmitting and receiving apparatus function, etc., various controlling functions such as switching of the screen, invoking of functions, determination of a selected item, etc., by execution of the above control program in response to the above opening or the closing operation of the fixed housing unit 4 and the movable housing unit 6, a rotational operation of the movable housing unit 6, etc.

The portable terminal apparatus 2 includes the input operating unit 16, the displaying unit 18, a CPU (Central Processing Unit) 90, a memory unit 92, a power source unit 94, a sensor unit 96, a radio unit 98, and a sound unit 100. The input operating unit 16 has a plurality of keys and is used to inputting telephone numbers, inputting characters to create a mail text, etc. The displaying unit 18 displays the vertically oriented screen or the horizontally oriented screen thereon. The screen form is switched to a different screen form according to the opened state or the closed state and the rotation angle of the movable housing unit 6. The screen layout is controlled corresponding to each of the vertically oriented screen or the horizontally oriented screen.

The CPU 90 executes the control program, etc., stored in the memory unit 92 and executes various types of control such as: input of the input operating unit 16; capturing of detected information and controlling information such as a detected signal of the sensor unit 96; reading and writing of information from/into the memory unit 92; and screen control of the displaying unit 18. In this case, for the vertically oriented screen or the horizontally oriented screen, the CPU 90 controls a screen layout corresponding to each of the screens and starts up the optimal function for each of the screens. The functions supporting the vertically oriented screen are used for display of a menu list, display of a data list, display of a telephone call history, etc., utilizing the spread in the longitudinal direction of the vertically oriented screen that is elongated in the vertical direction. The functions supporting the horizontally oriented screen are used for panorama display of a camera image, display of English texts, processing thereof, deployment of television broadcasting receiving screen, etc., utilizing the spread in the width direction of the horizontally oriented screen that is elongated in the horizontal direction.

The memory unit 92 stores a control program including switching of the screen, setting of the display column for the horizontally oriented screen, display of texts, etc., other programs, and various types of data and, in the embodiment, includes as recording media an SDRAM (Synchronous Dynamic Random-Access Memory) 102, a flash memory 104 for execution, and another flash memory 106 for storage. The SDRAM 102, the flash memory 104 for execution, and the flash memory 106 for storage are connected to the CPU 90 through a bus 108.

The SDRAM 102 constitutes a working area, executes a program read and loaded from the flash memory 106 for storage, and causes calculating processes to be executed and controlling information to be created. The flash memory 104 for execution stores various types of data and a database, etc., are constructed therein. The flash memory 106 for storage stores various programs such as an OS (Operating System) and a control program.

An external memory IF (InterFace) 110 is connected to an external memory such as a memory card and the external memory stores address data such as telephone numbers and mail addresses, various contents, etc.

The power source 94 includes a battery, a battery charging circuit controlled by the CPU 90, a stabilizing circuit, a power source controlling circuit, etc., and supplies electric power to various functional units such as the radio unit 98, etc.

The sensor unit 96 detects the opening or the closing of the movable housing unit 6 by the movable arm unit 8, the rotation angle θ (=zero degree to 90 degrees both on the left and the right) of the movable housing unit 6, and the direction of the rotation. The sensor unit 96 includes the opened state/closed state sensor 112 and the rotation sensors 42 and 44. The opened state/closed state sensor 112 detects the presence or absence of a magnetic flux from a magnet M1 (FIG. 6) and generates a detection output that represents whether the movable housing unit 6 is in the opened state or the closed state thereof. The rotation sensors 42 and 44 are mounted on the movable-side substrate 40 of the movable housing unit 6 and the mounting positions of the three magnets M2, M3, and M4 (FIG. 6) coincide with the positions on the track of the rotation sensors 42 and 44 of the movable housing unit 6 while the unit 6 is being rotated.

For example, because the magnet M2 overlaps the rotation sensor 42 at the central position a (FIG. 3) of the movable housing unit 6 and the magnet M3 overlaps the rotation sensor 44, an output indicating that the movable housing unit 6 is at the central position a can be obtained from the rotation sensors 42 and 44. At the central position a, for example, same outputs of high level outputs or low level outputs are obtained from the rotation sensors 42 and 44. When the movable housing unit 6 is rotated toward the right or the left, the magnetic power exerted from the magnets M2, M3, and M4 on the rotation sensors 42 and 44 is varied and outputs corresponding to the variation are generated respectively in the rotation sensors 42 and 44. Because the variation of the outputs is generated starting from the rotation angle θ=20 degrees on the right or the left, this indicates the direction of the rotation toward the right or the left. Outputs indicating the position of 90 degrees on the right or the position of 90 degrees on the left can be obtained respectively by the rotation sensors 42 and 44. For example, when a high level output is obtained from the rotation sensor 42 and a low level output is obtained from the rotation sensor 44, the outputs indicate the position of 90 degrees on the right and, when the opposite outputs are obtained, the outputs indicate the position of 90 degrees on the left.

The radio unit 98 executes transmission and reception of data communication such as audio communication or mailing, through an antenna 118 and executes a modulating process of sound and data and a demodulating process of sound and data from the radio signals, etc.

The sound unit 100 outputs received sound through a speaker 120 or capturing and amplifying of sound of a call to be transmitted, from a microphone 122, etc.

Figure 14A:
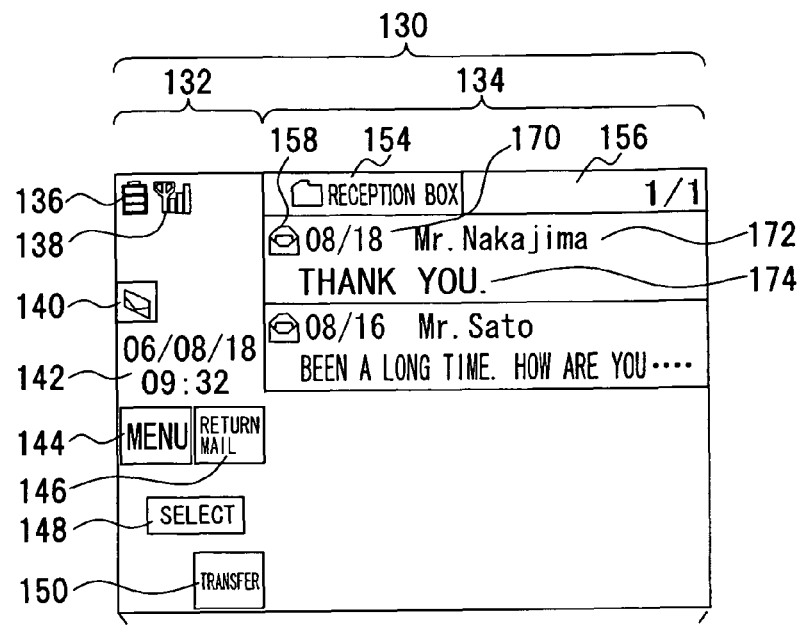
FIG. 14 depicts a horizontally oriented screen displaying mail texts (received mail list displaying mode)
Figure 14B:
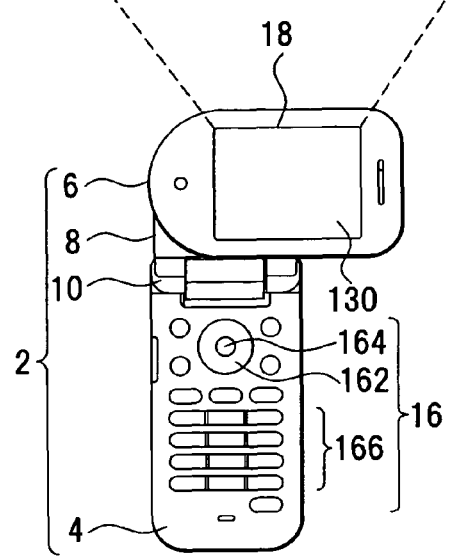
Figure 15A:
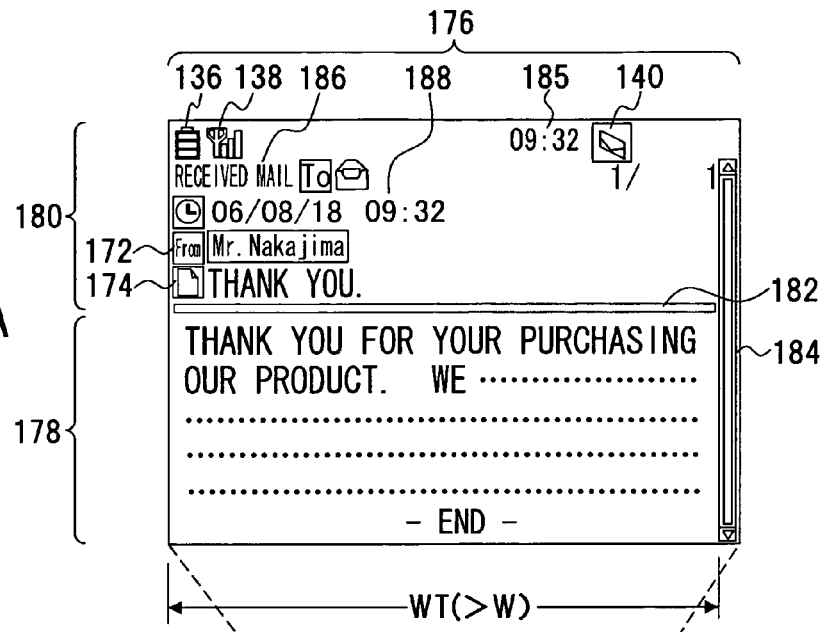
FIG. 15 depicts a horizontally oriented screen displaying a mail text (received mail contents displaying mode)
Figure 15B:
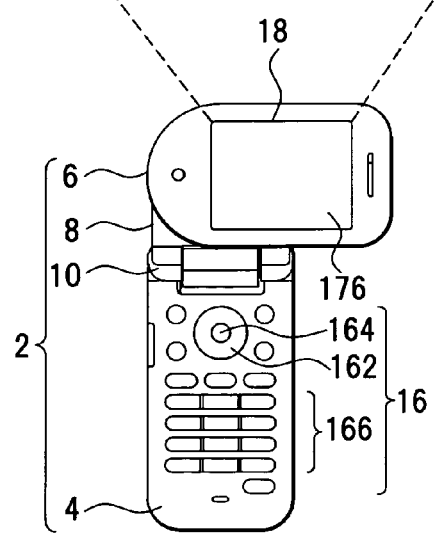
Figure 16A:
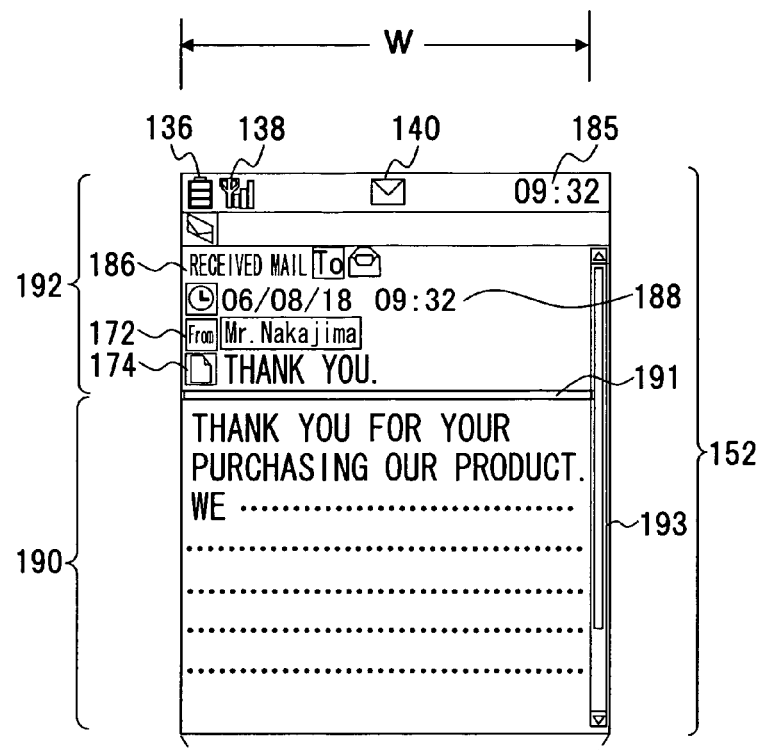
FIG. 16 depicts a vertically oriented screen displaying a mail text (vertical main display mode)
Figure 16B:
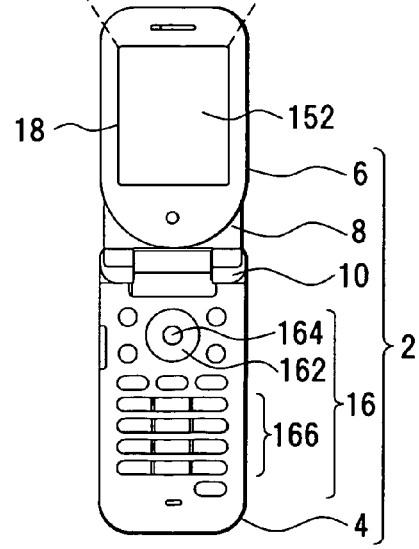

Description will be given for display of the vertically oriented screen and the horizontally oriented screen of the displaying unit 18 referring to FIGS. 14 to 16. FIG. 14 depicts a horizontally oriented screen displaying mail texts (received mail list displaying mode). FIG. 15 depicts a horizontally oriented screen displaying a mail text (received mail contents displaying mode). FIG. 16 depicts a vertically oriented screen displaying a mail text (vertical main display mode). In FIGS. 14 to 16, the same components as those in FIGS. 1 to 13 are given the same reference numerals.

When the displaying unit 18 displays text information or information including a text, the modes available include the received mail list displaying mode and the received mail contents displaying mode and the screen forms of the displaying unit 18 includes the horizontal main display mode and the vertical main display mode.

1) Horizontally Oriented Screen (Received Mail List Displaying Mode) (FIG. 14)

When the movable housing unit 6 is rotated toward the right from the central position a, a horizontally oriented screen 130 that is elongated in the horizontal direction is displayed. A status displaying column 132 and a received mail list displaying column 134 are set in the horizontally oriented screen 130 in the received mail list displaying mode.

In the status displaying column 132, a battery mark 136 that represents the state of the battery residual quantity, a radio field intensity mark 138 that represents the state of the radio field intensity, a mail mark 140 that represents the presence or absence of unread mail, a date/time display 142 that represents the current date/time, a menu icon 144, a return mail icon 146, a selection icon 148, and a transfer icon 150 are displayed. The menu icon 144, the return mail icon 146, the selection icon 148, and the transfer icon 150 correspond to the keys of the input operating unit 16. The menu icon 144 is used for invoking a menu column. The return mail icon 146 is used to designate returning mail. The selection icon 148 is used for selection items on the screen such as, for example, selecting mail. The transfer icon 150 is used to designate transfer of mail.

The received mail list displaying column 134 has the width thereof that is same as that of the display width W of a vertically oriented screen 152 (FIG. 16) in the vertical main display mode. In this case, in the received mail list displaying column 134, in the highest order row, a reception BOX mark 154 that represents the storage destination of data and a page column 156 are set. In the received mail list displaying column 134, spanning over the same width as the display width W in the vertical main mode, pieces of received mail are displayed in aging order downward from the one having latest date/time to the one having the oldest date/time, each having a received mail mark 158, a date/time display 170, a transmitting origin 172, and a title 174 as a unit.

2) Vertically Oriented Screen (Received Mail Contents Displaying Mode) (FIG. 15)

When a specific piece of received mail is selected from the horizontally oriented screen 130 in the received mail list displaying mode, the mode of operation is shifted to the received mail contents displaying mode and a horizontally oriented screen 176 is displayed. The horizontally oriented screen 176 is a screen for the case where text information or information including a text is displayed on the displaying unit 18, and a text displaying column 178 having the full lateral width WT (>W) that the horizontal oriented screen 176 has and can be displayed is set. In this case, a related information displaying column 180 is set in the upper row of the text displaying column 178. Between the text displaying column 178 and the related information displaying column 180, a partition bar 182 that partitions the columns 178 and 180 is displayed. At the right ends of the text displaying column 178 and the related information displaying column 180, a scrolling bar 184 spanning over the columns 178 and 180 is displayed.

In the text displaying column 178, the contents of the above mail text is displayed using the full width of the text displaying column 178 deployed widely. In the related information displaying column 180, the battery mark 136, the radio field intensity mark 138, the mail mark 140, a time display 185, a received mail display 186, a mail received date/time 188, the transmitting origin 172, and the title 174 are displayed. In this case, the text displaying column 178 uses the full width of the lateral direction displaying capacity that the horizontally oriented screen 176 has, and the displayed character strings of the mail text are displayed with sufficient spread in the lateral direction.

3) Vertically Oriented Screen (Vertical Main Display Mode) (FIG. 16)

The vertically oriented screen 152 is a screen for the case where text information or information including a text is displays on the displaying unit 18, and a text displaying column 190 having the full lateral width W (<WT) that the vertically oriented screen 152 has and can be displayed is set. In this case, a related information displaying column 192 is set in the upper row of the text displaying column 190. Between the text displaying column 190 and the related information displaying column 192, a partition bar 191 that partitions the columns 190 and 192 is displayed. At the right ends of the text displaying column 190 and the related information displaying column 192, a scrolling bar 193 spanning over the columns 190 and 192 is displayed. When the movable housing unit 6 is returned to the central position a from the horizontally oriented screen 176 by rotating the unit 6, the operation mode is shifted to the vertical main display mode and the vertically oriented screen 152, that is elongated in the vertical direction, is displayed on the displaying unit 18. The contents of display same as that of the horizontally oriented screen 176 are displayed in the vertically oriented screen 152 as a vertically oriented screen. Comparing the contents of display of FIG. 15 with that of FIG. 16, the character strings are obviously widely deployed in the lateral direction in the horizontally oriented screen 176 and, therefore, it can be understood that the horizontally oriented screen 176 is advantageous for displaying texts.

Figure 17:
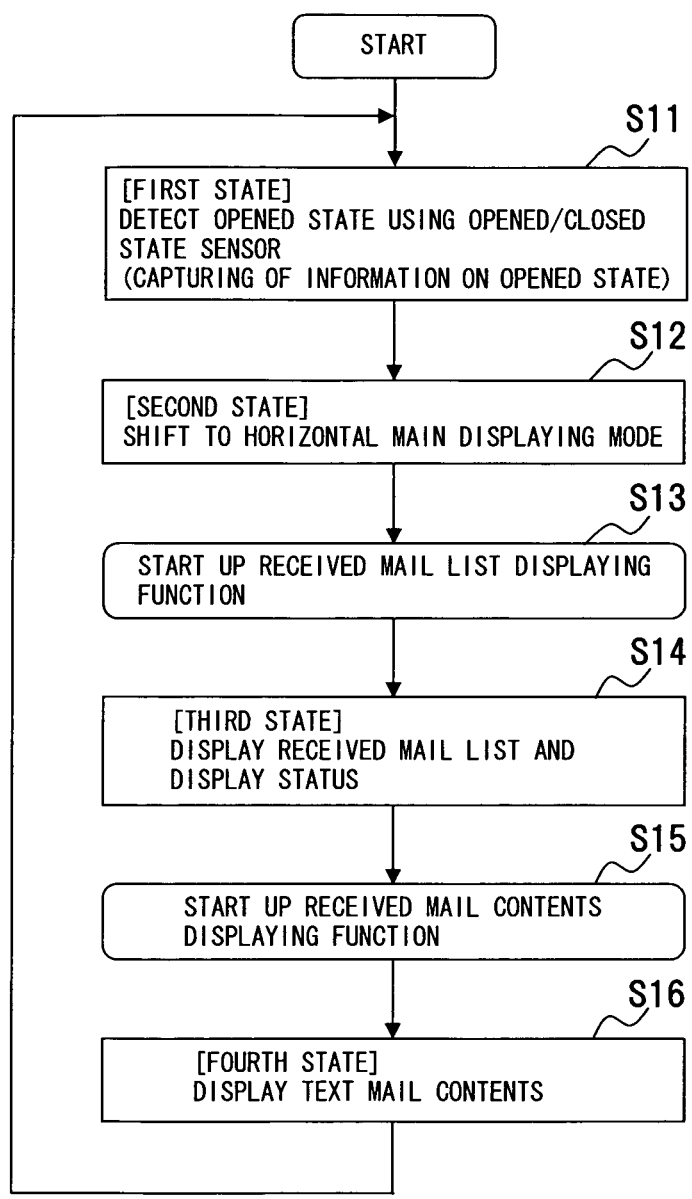
FIG. 17 depicts an example of a process procedure of a control program that executes processing of the displaying unit.

Description will be given for screen operations of the displaying unit 18 referring to FIG. 17. FIG. 17 depicts an example of a process procedure of the control program that executes processing of the displaying unit 18.

The control program includes process steps such as switching of the screen, setting of the display columns, and displaying of texts contents.

When the movable housing unit 6 is opened from the closed state thereof shown in FIGS. 1 and 2, the movable housing unit 6 is in the opened state thereof shown in FIG. 3 against the fixed housing unit 4. The opened state is detected by the opened state/closed state sensor 112 (step S11) and the CPU 90 captures detected information on the opened state from the opened state/closed state sensor 112 as a first state.

In the opened state, rotations of the movable housing unit 6 is monitored and, when the movable housing unit 6 is rotated toward the right or the left, the CPU 90 captures detected information from the rotation sensors 42 and 44 and judges whether the displaying unit 18 is rotated toward the right or the left based on the detected information and, as a second state, the operation mode is shifted to the horizontal main display mode (step S12).

In the horizontal main display mode, a received mail list displaying function is started up (step S13). In the received mail list displaying mode, as a third state, as shown in FIG. 14, a status display is deployed in the horizontally oriented screen together with the received mail list (step S14).

In the horizontally oriented screen to execute the received mail list displaying function (FIG. 14), a specific mail is selected. In this case, the latest mail is selected by putting the cursor thereon and, when the determination key 164 is pressed down, the operation mode is shifted to the received mail contents displaying mode and the received mail contents displaying function is started up (step S15).

In the received mail contents displaying mode, as a fourth state, as shown in FIG. 15, the text displaying column 178 is set in the horizontal oriented screen 176 and the contents of the text mail is displayed in the text displaying column 178 (step S16). In this case, the mail text is displayed using the full width of the lateral direction displaying capacity of the horizontally oriented screen 176 and, as above, the character strings of the mail text are displayed with sufficient spread in the lateral direction.

For the above first embodiment, the features thereof will be extracted and the action effects will be referred to.

The portable terminal apparatus 2 has the configuration that causes the screen unit, that is, the displaying unit 18 to rotate, has the folding function, and has a configuration that causes the movable housing unit 6 mounting the displaying unit 18 thereon to rotate for 90 degrees toward the right and left from the ordinary vertically-oriented-screen state.

The rotation and opening and closing of the movable housing unit 6 mounting the displaying unit 18 thereon are detected by the sensor unit 96 and the sensor unit 96 has a function of detecting whether the displaying unit 18 is rotated toward the right or the left.

The apparatus 2 has the configuration that causes the ordinary vertically-oriented-screen state to be switched to the horizontally oriented screen by rotating the screen unit for 90 degrees toward the right or the left. Therefore, the operation mode is shifted to the horizontal main display mode from the state where the vertically oriented screen is opened by rotating the display unit 18 toward either the right or the left and the text mail can be displayed spanning fully in the lateral direction. Therefore, the text can be easily read with the character strings being spread and this contributes to quicker grasp of the text contents.

Second Embodiment

Figure 18:
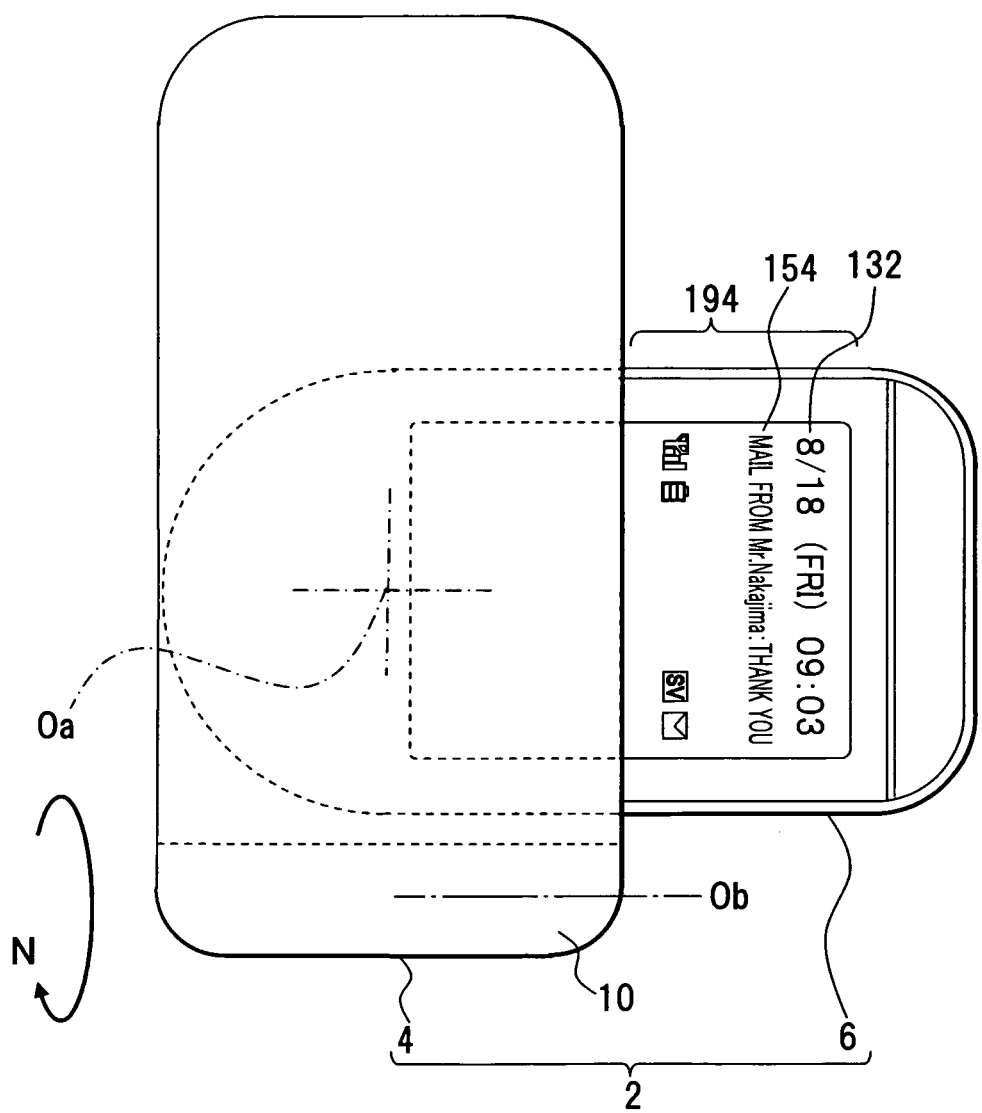
FIG. 18 depicts a horizontally oriented sub screen displaying a mail text (received mail list displaying mode) according to a second embodiment.
Figure 19:
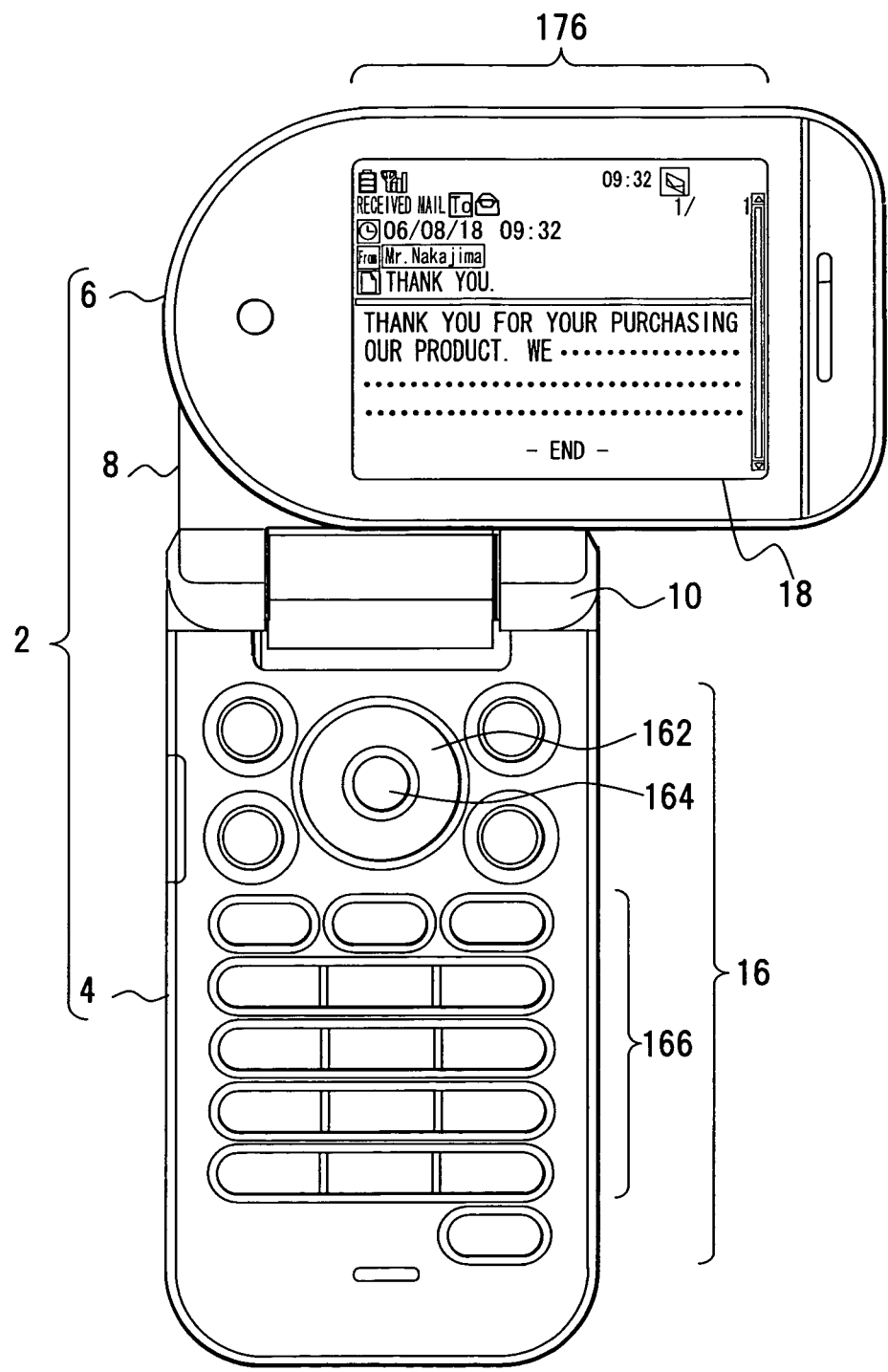
FIG. 19 depicts a horizontally oriented screen displaying a mail text (received mail contents displaying mode)

Description will be given for a second embodiment of the present invention referring to FIGS. 18 and 19. FIG. 18 depicts a horizontally oriented sub screen displaying a mail text (in the received mail list displaying mode). FIG. 19 depicts a horizontally oriented screen displaying a mail text (in the received mail contents displaying mode). In FIGS. 18 and 19, the same components as those in FIGS. 1 to 17 are given the same reference numerals.

In this embodiment, the configurations shown in FIGS. 1 to 13 are also used. This embodiment shows a process procedure according to which: the observable area of the displaying unit 18 is set in a horizontally oriented sub screen 194 by rotating the movable housing unit 6 while the movable housing unit 6 is closed, and the mail display of the horizontally oriented sub screen 194 is switched to a full-screen display of text mail by shifting to the opened state of the movable housing unit 6.

1) Horizontally Oriented Sub Screen 194 (Mail Receiving Mode) (FIG. 18)

In the case where mail has been received, etc., when the movable housing unit 6 is rotated toward, for example, the right while the movable housing unit 6 is closed, as show in FIG. 18, a portion of the screen of the displaying unit 18 on the movable housing unit 6 is exposed from the rear side of the fixed housing unit 4. The horizontally oriented screen is denoted by "horizontally oriented sub screen 194" and reporting information on received mail can be caused to be displayed in the horizontally oriented sub screen 194. In this case, the date/time of reception and the transmitting origin, etc. are displayed. The display contents may be a partial display of the received mail list displaying column 134 of the above horizontally oriented screen 130 (FIG. 14).

2) Horizontally Oriented Screen 176 (Received Mail Contents Displaying Mode) (FIG. 19)

For the portable terminal apparatus 2 shown in FIG. 18, when the fixed housing unit 4 is rotated in the direction indicated by an arrow N, in the received mail contents displaying mode, as shown in FIG. 19, the fixed housing unit 4 is placed beneath the movable housing unit 6 and the displaying unit 18 of the movable hosing unit 6 has the full-screen display of the horizontally oriented screen 176. Because this full-screen display is identical to the horizontal oriented screen 176 shown in FIG. 15, this display is given a same reference numeral and the description thereof is omitted.

Figure 20:
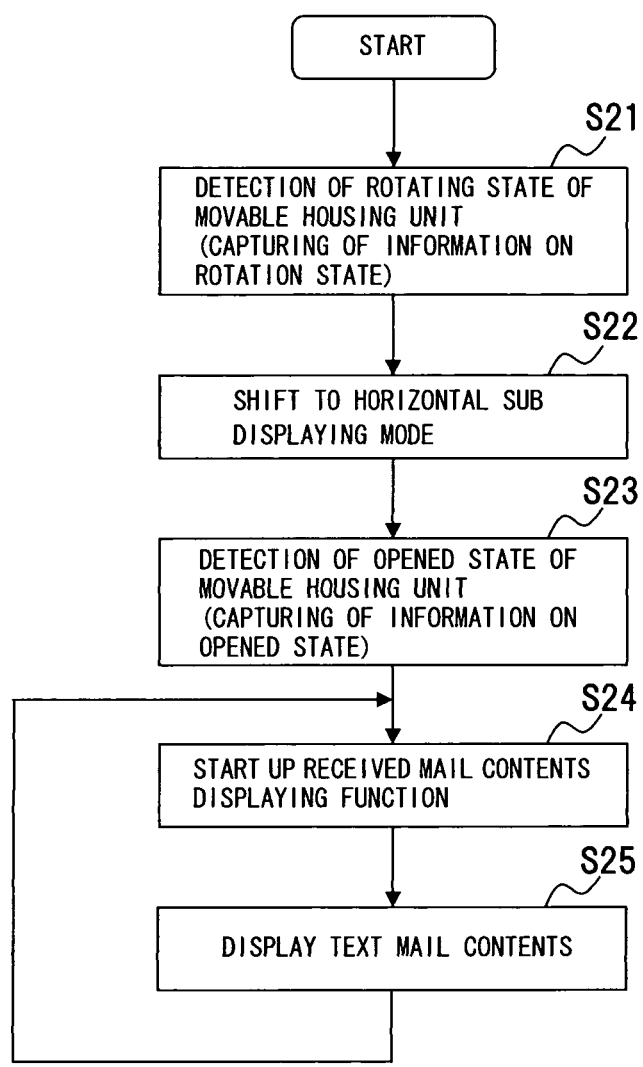
FIG. 20 depicts a flowchart of a process procedure of the control program.

Description will be given for screen operations of the displaying unit 18 referring to FIG. 20. FIG. 20 depicts a flowchart of a process procedure of another control program according to the second embodiment.

In the closed state shown in FIGS. 1 and 2, rotations of the movable housing unit 6 is monitored and, when the movable housing unit 6 is rotated toward the right or the left, the CPU 90 captures detected information from the rotation sensors 42 and 44 (step S21), and judges whether the displaying unit 18 is rotated toward the right or the left from the detected information and the operation mode is shifted to the horizontal sub display mode (step S22).

In the horizontal sub display mode, when the movable housing unit 6 is opened, the opened state is detected by the sensor 112 and the detected information on the opened state is captured (step S23), and the received mail contents displaying function is started up in the horizontal main display mode (step S24).

In the received mail contents displaying mode, as shown in FIG. 19, the text displaying column 178 is set in the horizontally oriented screen 176 and the contents of text mail is displayed in this text displaying column 178 (step S25). As above, the mail text is displayed using the full width of the lateral direction displaying capacity that the horizontally oriented screen 176 has and the character strings of the mail text are displayed with sufficient spread in the lateral direction as above.

In the embodiment, the operation of the movable housing unit 6 or the fixed housing unit 4 to the opened state thereof causes the operation mode to be shifted from the horizontal sub display mode thereof to the horizontal main display mode, and the full-screen display of the text mail can be executed in the horizontally oriented screen. Therefore, this contributes to quick checking of mail and quick grasp of mail texts.

Other Embodiments (1) Though the portable terminal apparatus 2 is exemplified as an electronic apparatus in the above embodiments, the present invention is also applicable to each of a gaming apparatus, a watch, etc., that includes the movable housing unit 6 and has a mail creating function, etc.

(2) For the case where text information or information including a text is displayed on the displaying unit 18, display of received mail is exemplified in the above embodiments. However, the present invention is applicable to displaying of various types of text information and information including texts provided through a network such as the Internet.

(3) Though displaying of mail texts is exemplified in the above embodiments, the apparatus may be adapted to automatically switch the display mode thereof to the horizontally oriented screen display and display with laterally elongated character strings even during the vertically oriented screen display in case that a text including a large amount of information is transmitted from, for example, a personal computer.

(4) Though the housing unit that can be opened/closed and is rotatable is configured by the fixed housing unit 4, the movable housing unit 6 and/or the movable arm unit 8 in the above embodiments, the housing unit that can be opened/closed and is rotatable may be configured by the fixed housing unit 4 and the movable housing unit 6.

As above, the description has been given for the most preferred embodiments of the present invention. However, the present invention is not limited to the above description. Those skilled in the art can surely make various modifications and changes thereto based on the purport of the present invention described in the appended claims or disclosed herein. Such modifications and changes are surely included in the scope of the present invention.

The present invention relates to an electronic apparatus such as a portable terminal apparatus having a displaying function in a housing unit that is rotatable and/or can be opened/closed and, when text information consisting of character strings, etc., or information including a text is displayed, the information is displayed by setting a displaying column in the full lateral width that can be displayed in a horizontally oriented screen. Therefore, improvement of an information displaying function can be facilitated and grasp of displayed information is easy, etc. Therefore, the present invention contributes to improvement of functionality and operability of an electronic apparatus having a displaying function, etc., and, therefore, is useful.

What is claimed is:

1. An electronic portable terminal apparatus having a displaying function in a housing unit thereof that can be opened/closed and is rotatable, comprising: a fixed housing unit; a movable arm unit that is fitted to the fixed housing unit through a hinging unit; a movable housing unit that is fitted rotatably using a rotation module to the movable arm unit; a display that is mounted on the movable housing unit, and displays one of a vertically oriented screen and a horizontally oriented screen correspondingly to a rotation of the movable housing unit; a controlling unit that, when text message or a message including a text is displayed on the display, sets a displaying column for the message in a full lateral width that the horizontally oriented screen has and can be displayed, in the horizontally oriented screen set on the display, and causes the information to be displayed in the displaying column; and an opened/closed state sensor that detects one of an opened state and a closed state of the housing unit, the opened state being a state where the movable housing unit and the movable arm unit are open to the fixed housing unit, the closed state being a state where a display side of the movable housing unit is in contact with the fixed housing unit, and the movable housing unit and the movable arm unit are close to the fixed housing unit, the movable housing unit and the movable arm unit being opened and closed due to a rotation around the hinging unit as a center thereof, wherein the controlling unit displays a horizontal sub screen when the movable housing unit that is closed is rotated to the right or the left while the housing unit is in the closed state, the horizontal sub screen being set in a portion of the display, the portion being exposed from the housing unit by the rotation of the movable housing unit, and switches the horizontal sub screen, displayed on the display, to the full lateral width display of the horizontally oriented screen when the opened/closed state sensor detects the opened state of the housing unit; wherein rotating on the rotation module rotates only the movable housing unit and rotating on the hinging unit opens/closes both the movable arm unit and the movable housing unit.

2. The electronic apparatus of claim 1, wherein
when a text list is displayed, the controlling unit sets a text list displaying column having a substantially same width as that of the vertically oriented screen, in the horizontally oriented screen, and causes a text title to be displayed in the text list displaying column.

3. The electronic apparatus of claim 1, wherein
when a text list is displayed, the controlling unit sets, in the horizontally oriented screen, a text list displaying column, that has a substantially same width as that of the vertically oriented screen, and a status displaying column, and causes text titles to be displayed in the text list displaying column.

4. The electronic apparatus of claim 3, wherein
when the text list display is changed to a text contents display, the controlling unit sets a displaying column having the full lateral width that can be displayed, in the horizontally oriented screen of the display, and causes the information to be displayed in the displaying column.

5. The electronic apparatus of claim 1, wherein
when the vertically oriented screen on the display is switched to the horizontally oriented screen, the controlling unit switches the display contents of the vertically oriented screen to the displaying column of the horizontally oriented screen and displays the displaying column.

6. The electronic apparatus of claim 1, further comprising a rotation sensor that detects a rotation and/or a rotation position of the housing unit, wherein
the controlling unit switches a screen of the display to the horizontally oriented screen based on detected information of the rotation sensor.

7. The electronic apparatus of claim 1, wherein the text is a mail text.

8. A control method of an electronic portable terminal apparatus having a displaying function in a housing unit thereof that can be opened/closed and is rotatable, comprising: displaying one of a vertically oriented screen and a horizontally oriented screen on a display mounted on a movable housing unit correspondingly to a rotation of the movable housing unit that is fitted rotatably using a rotation module to a movable arm unit of the housing unit, the movable arm unit being fitted to a fixed housing unit of the housing unit through a hinging unit; setting a displaying column in a full lateral width that the horizontally oriented screen has and can be displayed, in the horizontally oriented screen, and causing a text message to be displayed in the displaying column when the text message or a message including a text is displayed; detecting one of an opened state and a closed state of the housing unit, the opened state being a state where the movable housing unit and the movable arm unit are open to the fixed housing unit, the closed state being a state where a display side of the movable housing unit is in contact with the fixed housing unit, and the movable housing unit and the movable arm unit are close to the fixed housing unit, the movable housing unit and the movable arm unit being opened and closed due to a rotation around the hinging unit as a center thereof; displaying a horizontal sub screen when the movable housing unit that is closed is rotated to the right or the left while the housing unit is in the closed state, the horizontal sub screen being set in a portion of the display, the portion being exposed from the housing unit by the rotation of the movable housing unit; and switching the horizontal sub screen, which is displayed, to the full lateral width display of the horizontally oriented screen when the opened state of the housing unit is detected while the horizontal sub screen is displayed; wherein rotating on the rotation module rotates only the movable housing unit and rotating on the hinging unit opens/closes both the movable arm unit and the movable housing unit.

9. The control method of an electronic apparatus of claim 8, further comprising
setting a text list displaying column having a substantially same width as that of the vertically oriented screen, in the horizontally oriented screen, and causing text titles to be displayed in the text list displaying column when a text list is displayed.

10. The control method of an electronic apparatus of claim 8, further comprising:
setting, in the horizontally oriented screen, a text list displaying column, that has a substantially same width as that of the vertical oriented screen, and a status displaying column, and causing text titles to be displayed in the text list displaying column when a text list is displayed.

11. The control method of an electronic apparatus of claim 10, further comprising:
setting a displaying column having the full lateral width that can be displayed, in the horizontally oriented screen, and causing the information to be displayed in the displaying column when the text list display is changed to a text contents display.

12. The control method of an electronic apparatus of claim 8, further comprising:
switching the display contents of the vertically oriented screen to the text displaying column of the horizontally oriented screen and displaying the text displaying column when the vertically oriented screen is switched to the horizontally oriented screen.

13. The control method of an electronic apparatus of claim 8, further comprising:
switching the display to the display of the horizontally oriented screen based on detected information on a rotation and/or a rotation position of the housing unit.

14. A non-transitory computer-readable medium that stores a control program of an electronic portable terminal apparatus having a displaying function in a housing unit thereof that can be opened/closed and is rotatable, executed by a computer, the control program causing the computer to perform a method, the method comprising: displaying one of a vertically oriented screen and a horizontally oriented screen on a display mounted on a movable housing unit correspondingly to a rotation of the movable housing unit that is fitted rotatably using a rotation module to a movable arm unit of the housing unit, the movable arm unit being fitted to a fixed housing unit of the housing unit through a hinging unit; setting a displaying column in a full lateral width that the horizontally oriented screen has and can be displayed, in the horizontally oriented screen, and causing a text message to be displayed in the displaying column when the text message or a message including a text is displayed; detecting one of an opened state and a closed state of the housing unit, the opened state being a state where the movable housing unit and the movable arm unit are open to the fixed housing unit, the closed state being a state where a display side of the movable housing unit is in contact with the fixed housing unit, and the movable housing unit and the movable arm unit are close to the fixed housing unit, the movable housing unit and the movable arm unit being opened and closed due to a rotation around the hinging unit as a center thereof; displaying a horizontal sub screen when the movable housing unit that is closed is rotated to the right or the left while the housing unit is in the closed state, the horizontal sub screen being set in a portion of the display, the portion being exposed from the housing unit by the rotation of the movable housing unit; and switching the horizontal sub screen, which is displayed, to the full lateral width display of the horizontally oriented screen when the opened state of the housing unit is detected while the horizontal sub screen is displayed; wherein rotating on the rotation module rotates only the movable housing unit and rotating on the hinging unit opens/closes both the movable arm unit and the movable housing unit.

15. The control program of an electronic apparatus of claim 14, the method further comprising:
setting a text list displaying column having a substantially same width as that of the vertical oriented screen, in the horizontally oriented screen, and causing text titles to be displayed in the text list displaying column when a text list is displayed.

16. The control program of an electronic apparatus of claim 14, the method further comprising:
setting, in the horizontally oriented screen, a text list displaying column, that has a substantially same width as that of the vertical oriented screen, and a status displaying column, and causing text titles to be displayed in the text list displaying column when a text list is displayed.

17. The control program of an electronic apparatus of claim 14, the method further comprising:
setting a displaying column having the full lateral width that can be displayed, in the horizontally oriented screen, and causing the information to be displayed in the displaying column when the text list display is changed to a text contents display.

18. The control program of an electronic apparatus of claim 14, the method further comprising:
switching the display contents of the vertically oriented screen to the text displaying column of the horizontally oriented screen and displaying the text displaying column when the vertically oriented screen is switched to the horizontally oriented screen.

19. The control program of an electronic apparatus of claim 14, the method further comprising:
switching the display to the display of the horizontally oriented screen based on detected information on a rotation and/or a rotation position of the housing unit.

20. A non-transitory recording medium that stores a computer readable control program of an electronic portable terminal apparatus having a displaying function in a housing unit thereof that can be opened/closed and is rotatable, the control program causing a computer to perform a method, the method comprising: displaying one of a vertically oriented screen and a horizontally oriented screen on a display mounted on a movable housing unit correspondingly to a rotation of the movable housing unit that is fitted rotatably using a rotation module to a movable arm unit of the housing unit, the movable arm unit being fitted to a fixed housing unit of the housing unit through a hinging unit; setting a displaying column in a full lateral width that the horizontally oriented screen has and can be displayed, in the horizontally oriented screen, and causing a text message to be displayed in the displaying column when the text message or a message including a text is displayed; detecting one of an opened state and a closed state of the housing unit, the opened state being a state where the movable housing unit and the movable arm unit are open to the fixed housing unit, the closed state being a state where a display side of the movable housing unit is in contact with the fixed housing unit, and the movable housing unit and the movable arm unit are close to the fixed housing unit, the movable housing unit and the movable arm unit being opened and closed due to a rotation around the hinging unit as a center thereof; displaying a horizontal sub screen when the movable housing unit that is closed is rotated to the right or the left while the housing unit is in the closed state, the horizontal sub screen being set in a portion of the display, the portion being exposed from the housing unit by the rotation of the movable housing unit; and switching the horizontal sub screen, which is displayed, to the full lateral width display of the horizontally oriented screen when the opened state of the housing unit is detected while the horizontal sub screen is displayed; wherein rotating on the rotation module rotates only the movable housing unit and rotating on the hinging unit opens/closes both the movable arm unit and the movable housing unit.

21. The recording medium that stores a computer readable control program of an electronic apparatus of claim 20, the method further comprising:
setting a text list displaying column having a substantially same width as that of the vertical oriented screen, in the horizontally oriented screen, and causing text titles to be displayed in the text list displaying column when a text list is displayed.

22. The recording medium that stores a computer readable control program of an electronic apparatus of claim 20, the method further comprising:
setting, in the horizontally oriented screen, a text list displaying column having a substantially same width as that of the vertical oriented screen, and a status displaying column, and causing text titles to be displayed in the text list displaying column when a text list is displayed.

23. The recording medium that stores a computer readable control program of an electronic apparatus of claim 20, the method further comprising:
setting a displaying column having the full lateral width that can be displayed, in the horizontally oriented screen, and causing the information to be displayed in the displaying column when the text list display is changed to a text contents display.

24. The recording medium that stores a computer readable control program of an electronic apparatus of claim 20, the method further comprising:
switching the display contents of the vertically oriented screen to the text displaying column of the horizontally oriented screen and displaying the text displaying column when the vertically oriented screen is switched to the horizontally oriented screen.

25. The recording medium that stores a computer readable control program of an electronic apparatus of claim 20, the method further comprising:
switching the display to the display of the horizontally oriented screen based on detected information on a rotation and/or a rotation position of the housing unit.

* * * * *